(12) United States Patent
Koreeda et al.

(10) Patent No.: US 11,754,792 B2
(45) Date of Patent: Sep. 12, 2023

(54) CONNECTOR DEVICE

(71) Applicant: JAPAN AVIATION ELECTRONICS INDUSTRY, LIMITED, Tokyo (JP)

(72) Inventors: Yuichi Koreeda, Tokyo (JP); Hideto Shimazu, Tokyo (JP); Masaki Ishiguro, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 332 days.

(21) Appl. No.: 17/289,050

(22) PCT Filed: Sep. 10, 2019

(86) PCT No.: PCT/JP2019/035523
§ 371 (c)(1),
(2) Date: Apr. 27, 2021

(87) PCT Pub. No.: WO2020/137018
PCT Pub. Date: Jul. 2, 2020

(65) Prior Publication Data
US 2021/0405300 A1  Dec. 30, 2021

(30) Foreign Application Priority Data
Dec. 25, 2018  (JP) ................... 2018-241233

(51) Int. Cl.
*G02B 6/38* (2006.01)
*H01R 13/631* (2006.01)

(52) U.S. Cl.
CPC ............ *G02B 6/389* (2013.01); *G02B 6/387* (2013.01); *G02B 6/3817* (2013.01); *G02B 6/3897* (2013.01); *H01R 13/631* (2013.01)

(58) Field of Classification Search
CPC ...... G02B 6/389; G02B 6/3817; G02B 6/387; G02B 6/3897; G02B 6/38; H01R 13/631; H01R 13/6277; H01R 13/639
See application file for complete search history.

(56) References Cited

U.S. PATENT DOCUMENTS 8,303,326 B1 *  11/2012  McKee .............. H01R 13/6275
                                                    439/358
9,263,816 B1 *   2/2016  Leme ................... B60R 16/0238
(Continued)

FOREIGN PATENT DOCUMENTS

DE         44 39 852 A1    5/1996
DE    10 2016 111458 A1   12/2017
(Continued)

OTHER PUBLICATIONS

European Search Report in 19902085.0-1201, dated Nov. 25, 2021.
International Search Report in PCT/JP2019/035523, dated Nov. 26, 2019.

*Primary Examiner* — Jennifer Doan
(74) *Attorney, Agent, or Firm* — Collard & Roe, P.C.

(57) ABSTRACT

This connector (100) is provided with a locking member (200), a receiving part (192), an additional elastic part (420) and a pressing member (440). The locking member (200) comprises a supporting part (220) and a locking part (250). A mating-side connector (600) is provided with a mating-side locking part (660) and an abutting part (632). In the fitted state, the locking part (250) applies backwards force on the mating-side locking part (660) with the elasticity of the supporting part (220). The abutting part (632) is positioned in front of the receiving part (192), is pressed against the receiving part (192), and is restricted from moving backwards by the receiving part (192). When the pressing member (440) is in a first position, the additional elastic part (420) is interposed between the supporting part (220) and (Continued)

the pressing member (440), presses down the supporting part (220), and maintains pressing of the locking part (250) against the mating-side locking part (660). In this way, in the fitted state, even when an outside force in the fitting direction is applied to the connector (100) or the mating-side connector (600), the connector (100) does not move in the fitting direction relative to the mating-side connector (600).

16 Claims, 25 Drawing Sheets

(56) References Cited

U.S. PATENT DOCUMENTS

| | | |
|---|---|---|
| 10,211,568 B2 | 2/2019 | Blakborn et al. |
| 10,587,078 B2 | 3/2020 | Friesen |
| 2015/0180169 A1* | 6/2015 | Yu .......................... H01R 13/04 |
| | | 439/357 |

FOREIGN PATENT DOCUMENTS

| | | |
|---|---|---|
| JP | S58-118682 U | 8/1983 |
| JP | H07-302647 A | 11/1995 |
| JP | H09-102363 A | 4/1997 |
| JP | 2002-198127 A1 | 7/2002 |
| JP | 2006-185874 A | 7/2006 |
| JP | 2018-508098 A | 3/2018 |

* cited by examiner

CONNECTOR DEVICE

CROSS REFERENCE TO RELATED APPLICATIONS

This application is the National Stage of PCT/JP2019/035523 filed on Sep. 10, 2019, which claims priority under 35 U.S.C. § 119 of Japanese Application No. 2018-241233 filed on Dec. 25, 2018, the disclosure of which is incorporated by reference. The international application under PCT article 21(2) was not published in English.

TECHNICAL FIELD

This invention relates to a connector device having a connector and a mating connector.

BACKGROUND ART

Referring to FIGS. 40 and 41, Patent Document 1 discloses a connector device 900 which is provided with a connector 910 and a mating connector 950 which is mateable with and removable from the connector 910 along a front-rear direction (an X-direction). The connector 910 is provided with one locking hole 922, one locking portion 924, one supporting portion 920, a hood-portion-accommodation portion 926 and a front retainer 928. The locking portion 924 is a surface directed rearward (a negative X-direction) of the locking hole 922. The supporting portion 920 has resilience and supports the locking portion 924. The locking portion 924 is movable in an orthogonal direction (a Z-direction) orthogonal to the front-rear direction owing to resilient deformation of the supporting portion 920. The hood-portion-accommodation portion 926 is a space extending in the front-rear direction. The mating connector 950 is provided with one mating locking protrusion 960, one mating locking portion 962, a hood portion 965 and a front retainer accommodation portion 968. The mating locking portion 962 is a front surface (a positive X-surface) of the mating locking protrusion 960.

A mating operation of the connector 910 and the mating connector 950 is carried out as follows. Firstly, the connector 910 and the mating connector 950 are arranged as shown in FIG. 40. Then, the connector 910 and the mating connector 950 are brought close to each other in the front-rear direction. As a result, the hood-portion-accommodation portion 926 of the connector 910 accommodates the hood portion 965 of the mating connector 950. At this time, a front-end portion (a positive X-side end portion) of the supporting portion 920 of the connector 910 is brought into abutment with the mating locking protrusion 960 of the mating connector 950 and rides on the mating locking protrusion 960 of the mating connector 950 owing to the resilient deformation of the supporting portion 920 of the connector 910. Here, upon further bringing the connector 910 and the mating connector 950 close to each other, the supporting portion 920 of the connector 910 returns to an original shape, and the mating locking protrusion 960 of the mating connector 950 is accommodated in the locking hole 922 of the connector 910. In other words, the connector 910 and the mating connector 950 are mated with each other and put into a mated state shown in FIG. 41. Here, in the mated state that the connector 910 and the mating connector 950 are mated with each other, the mating connector 950 is positioned forward (a positive X-direction) of the connector 910 in the front-rear direction.

PRIOR ART DOCUMENTS

Patent Document(s)

Patent Document 1: JPA 2002-198127

SUMMARY OF INVENTION

Technical Problem

In the connector device 900 of Patent Document 1, even when the connector 910 and the mating connector 950 are in the mated state, there is a space 980 between a rear end 927 of the hood-portion-accommodation portion 926 of the connector 910 and a rear end 966 of the hood portion 965 of the mating connector 950 in the front-rear direction or a mating direction, and there is a space 990 between a front end 929 of the front retainer 928 of the connector 910 and a front end 969 of the front retainer accommodation portion 968 of the mating connector 950 in the mating direction. Accordingly, if an external force in the mating direction (the front-rear direction) is applied to the connector 910 or the mating connector 950 in the mated state of the connector 910 and the mating connector 950, the connector 910 is moved with respect to the mating connector 950 in the mating direction (the front-rear direction). Thus, the connector device 900 has a possibility of deterioration of connection characteristics.

Therefore, an object of the present invention is to provide a connector device in which a connector is not moved with respect to a mating connector in a mating direction even if an external force in the mating direction is applied to the connector or the mating connector in a mated state that the connector and the mating connector are mated with each other.

Solution to Problem

One aspect of the present invention provides a connector device comprising a connector and a mating connector which is mateable with and removable from the connector along a front-rear direction, wherein:

in a mated state that the connector and the mating connector are mated with each other, the mating connector is positioned forward of the connector in the front-rear direction;

the connector comprises a locking member, a receiving portion, an additional resilience portion and a retaining member;

the locking member has at least one supporting portion and at least one locking portion;

the supporting portion has resilience and supports the locking portion;

the locking portion is movable at least in an orthogonal direction orthogonal to the front-rear direction owing to a resilient deformation of the supporting portion;

the mating connector comprises at least one mating locking portion and an abutment portion;

in the mating connector, relative positions of the mating locking portion and the abutment portion in the front-rear direction are fixed;

at least one of the locking portion and the mating locking portion has an intersecting surface intersecting with both of the front-rear direction and the orthogonal direction;

in the mated state, the mating locking portion is positioned inward of the locking portion in the orthogonal direction;

in the mated state, the locking portion is pressed against the mating locking portion in the intersecting surface owing to the resilience of the supporting portion and applies a rearward force in the front-rear direction to the mating locking portion;

in the mated state, the abutment portion is positioned forward of the receiving portion in the front-rear direction and brought into abutment with the receiving portion by the rearward force so that rearward movement of the abutment portion is regulated by the receiving portion so as not to be beyond the receiving portion.

the retaining member is located outward of the locking member in the orthogonal direction and attached to the locking member to be relatively movable with respect to the locking member between a first position and a second position in a movable direction orthogonal to both of the front-rear direction and the orthogonal direction;

the additional resilience portion is located inward of the retaining member in the orthogonal direction;

when the retaining member is positioned in the first position in the mated state, the additional resilience portion lies between the supporting portion and the retaining member and presses the supporting portion by applying an inward force in the orthogonal direction to the supporting portion so as to form a maintained state maintaining pressing of the locking portion against the mating locking portion; and when the retaining member is positioned in the second position in the mated state, the additional resilience portion does not press the supporting portion so that the maintained state is cancelled.

Advantageous Effects of Invention

In the connector device of the present invention, the locking portion of the connector applies a rearward force to the mating locking portion of the mating connector in the mated state of the connector and the mating connector. Owing to this rearward force, the abutment portion of the mating connector is brought into abutment with the receiving portion of the connector so that rearward movement thereof beyond the receiving portion is regulated by the receiving portion. Thus, the connector device of the present invention is structured so that the connector is not moved with respect to the mating connector even if the external force is applied to the connector or the mating connector in the mating state of the connector and the mating connector. Therefore, the connector device of the present invention can supply stable connection characteristics in the mated state of the connector and the mating connector.

In particular, in the connector device of the present invention, the retaining portion is attached to the locking member so as to be located outward of the locking member in the orthogonal direction and to be relationally movable between the first position and the second position with respect to the locking member in the movable direction orthogonal to both of the front-rear direction and the orthogonal direction. With this structure, in the mated state, when the retaining portion is positioned in the first position, the additional resilience portion located inward of the retaining portion in the orthogonal direction lies between the supporting portion and the retaining portion and applies the inward force in the orthogonal direction to the supporting portion to press the supporting portion. This forms the maintained state that maintains pressing of the locking portion against the mating locking portion. Thus, the connector device of the present invention can maintain the state that the locking portion is pressed against the mating locking portion in the mated state without a maintain means which is distinct and separated from the connector and the mating connector and can supply more stable connection characteristics.

An appreciation of the objectives of the present invention and a more complete understanding of its structure may be had by studying the following description of the preferred embodiment and by referring to the accompanying drawings.

DESCRIPTION OF EMBODIMENTS

Figure 1:
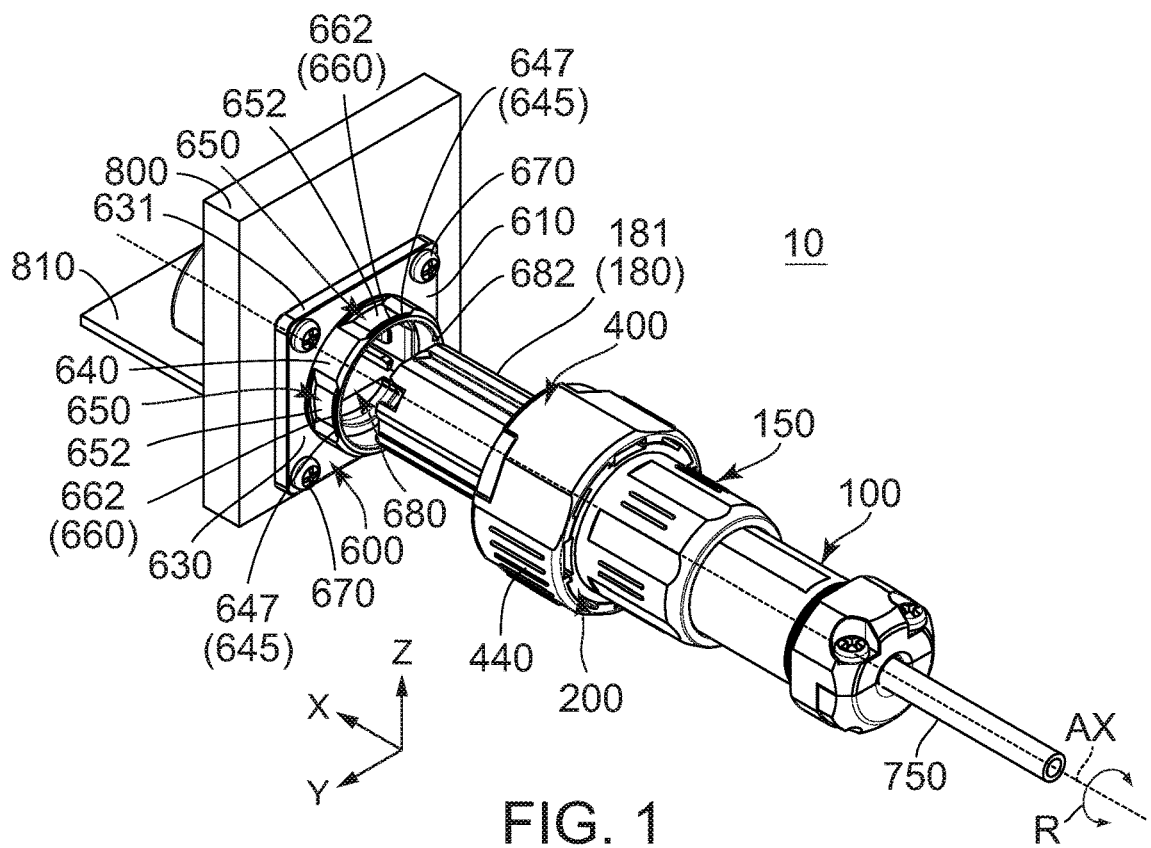
FIG. 1 is a perspective view showing a connector device according to a first embodiment of the present invention. In the figure, a connector and a mating connector are not mated with each other.
Figure 2:
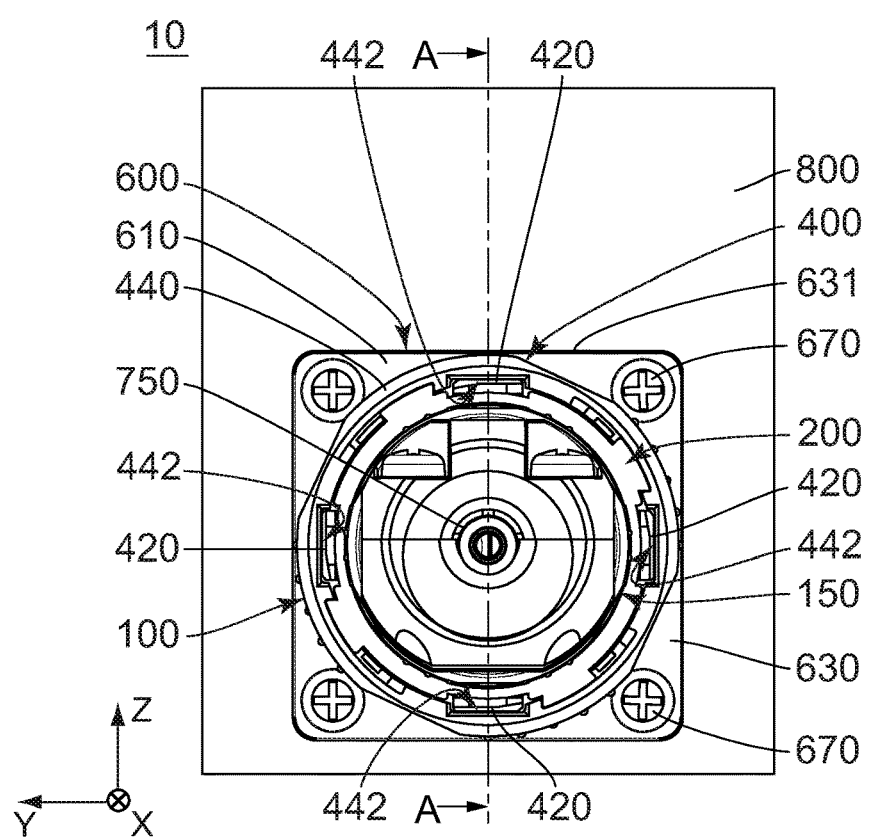
FIG. 2 is a rear view showing the connector device of FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

First Embodiment

As shown in FIG. 1, a connector device 10 according to an embodiment of the present invention is provided with a mating connector 600 and a connector 100. In other words, the mating connector 600 of the present embodiment is used in the connector device 10. Moreover, the connector 100 of the present embodiment is used in the connector device 10.

Figure 15:
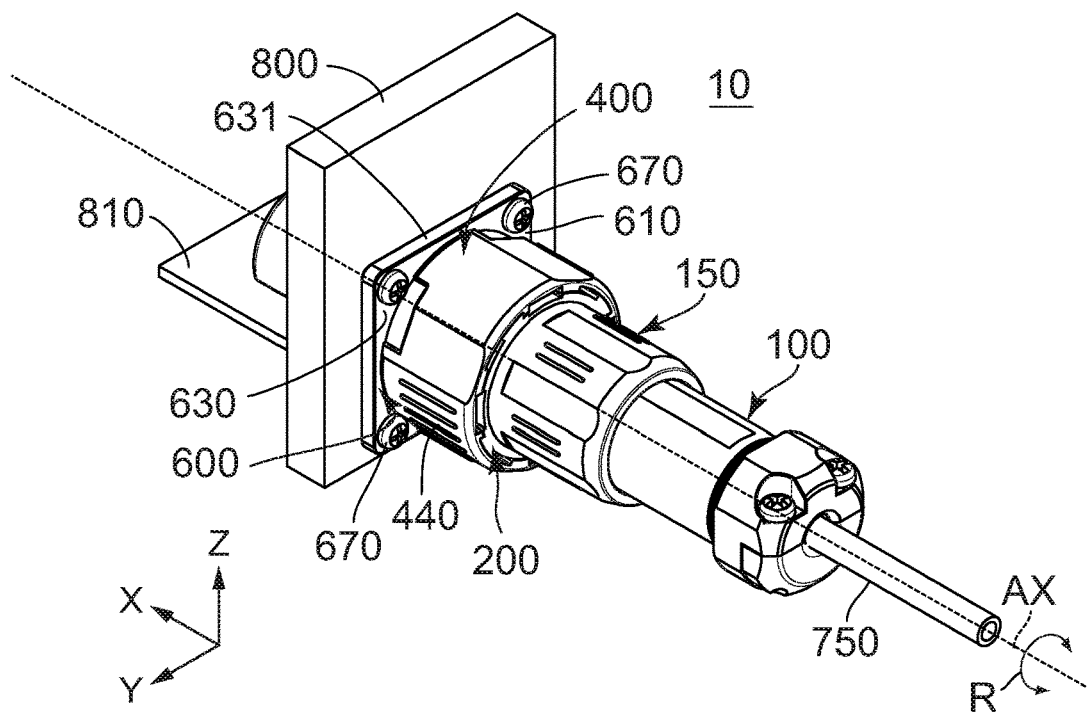
FIG. 15 is another perspective view showing the connector device of FIG. 1. In the figure, the connector and the mating connector are in a first mated state. Moreover, in the figure, the retaining portion of the connector is positioned in a second position. Although a locking portion is pressed against a mating locking portion of the mating connector, a maintaining mechanism of the connector device does not press a supporting portion of the locking member of the connector.
Figure 16:
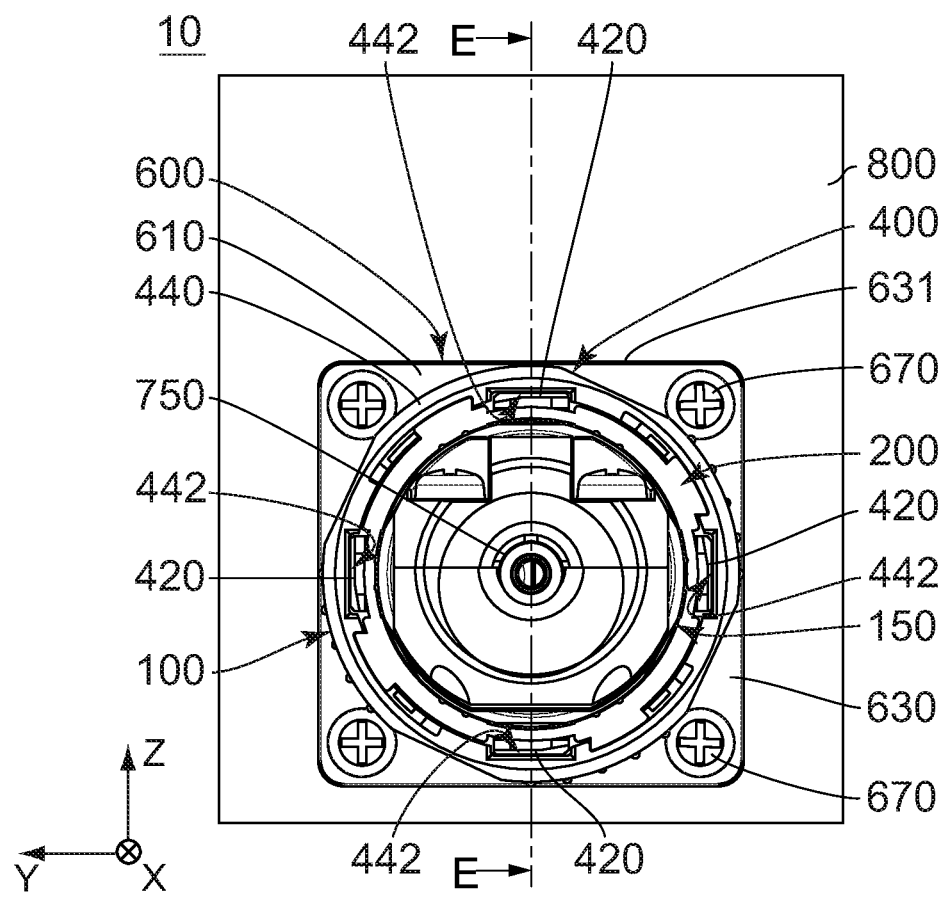
FIG. 16 is a rear view showing the connector device of FIG. 15.
Figure 22:
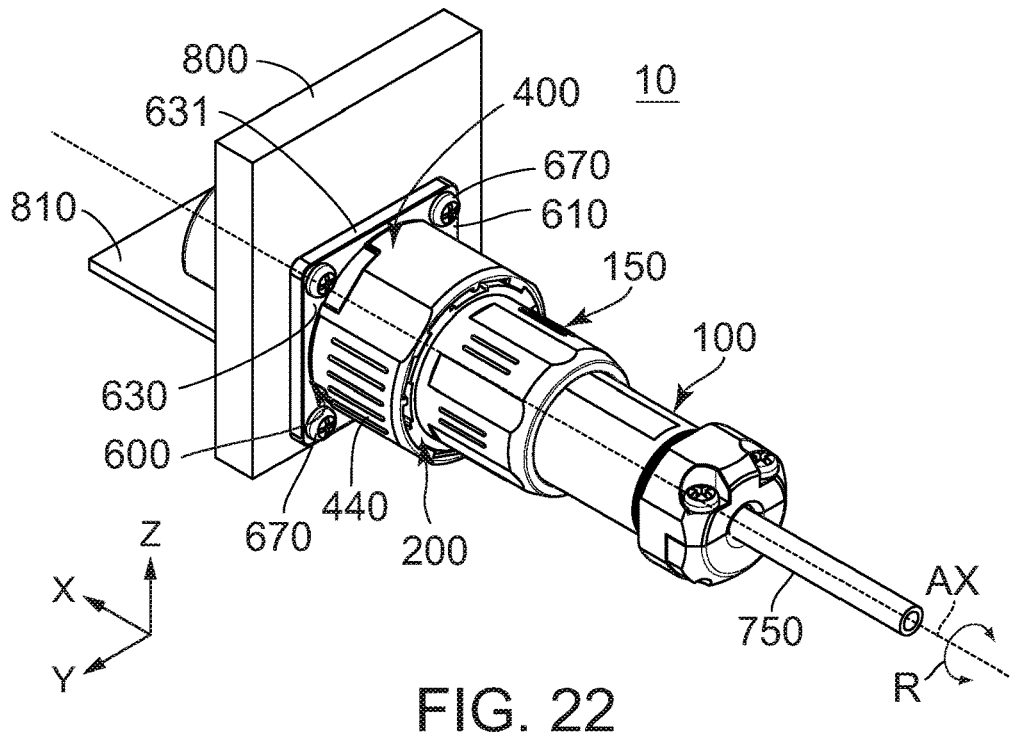
FIG. 22 is yet another perspective view showing the connector device of FIG. 1. In the figure, the connector and the mating connector are in a second mated state. Moreover, in the figure, the retaining portion of the connector is positioned in a first position. The maintaining mechanism of the connector device presses the supporting portion of the locking member of the connector.
Figure 23:
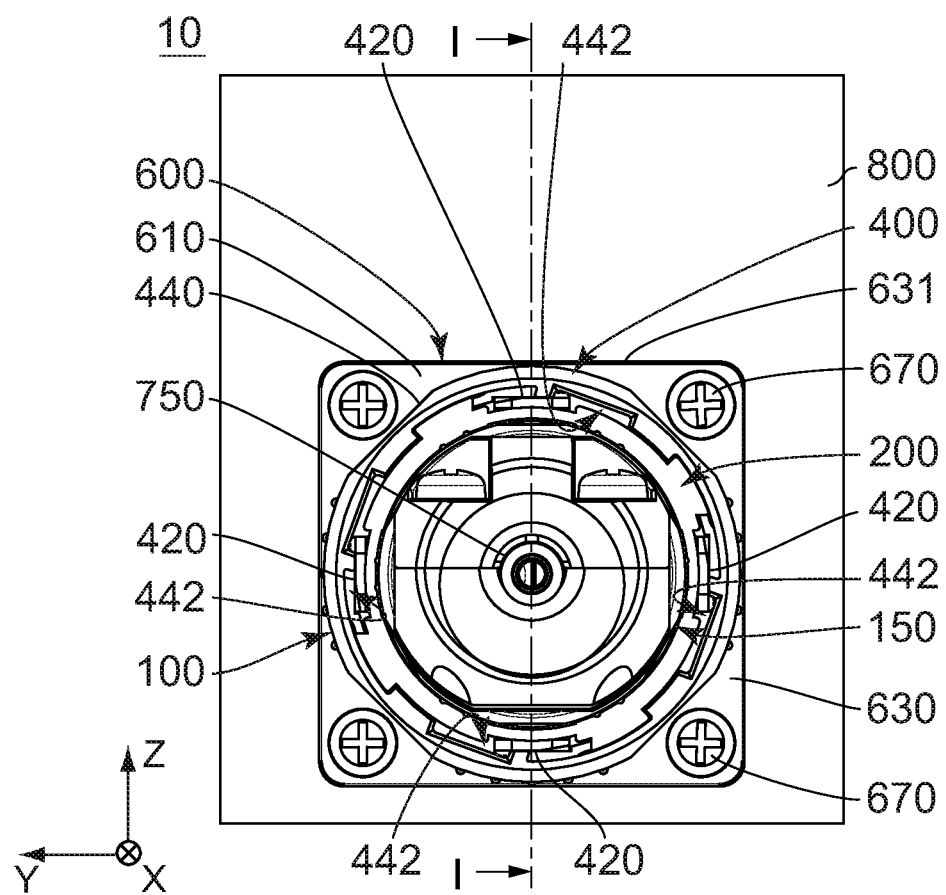
FIG. 23 is a rear view showing the connector device of FIG. 22.

As shown in FIGS. 1, 15 and 22, the mating connector 600 according to the present embodiment is mateable with and removable from the connector 100 along a front-rear direction. In the present embodiment, the front-rear direction is an X-direction. A positive X-direction is directed forward while a negative X-direction is directed rearward.

Figure 4:
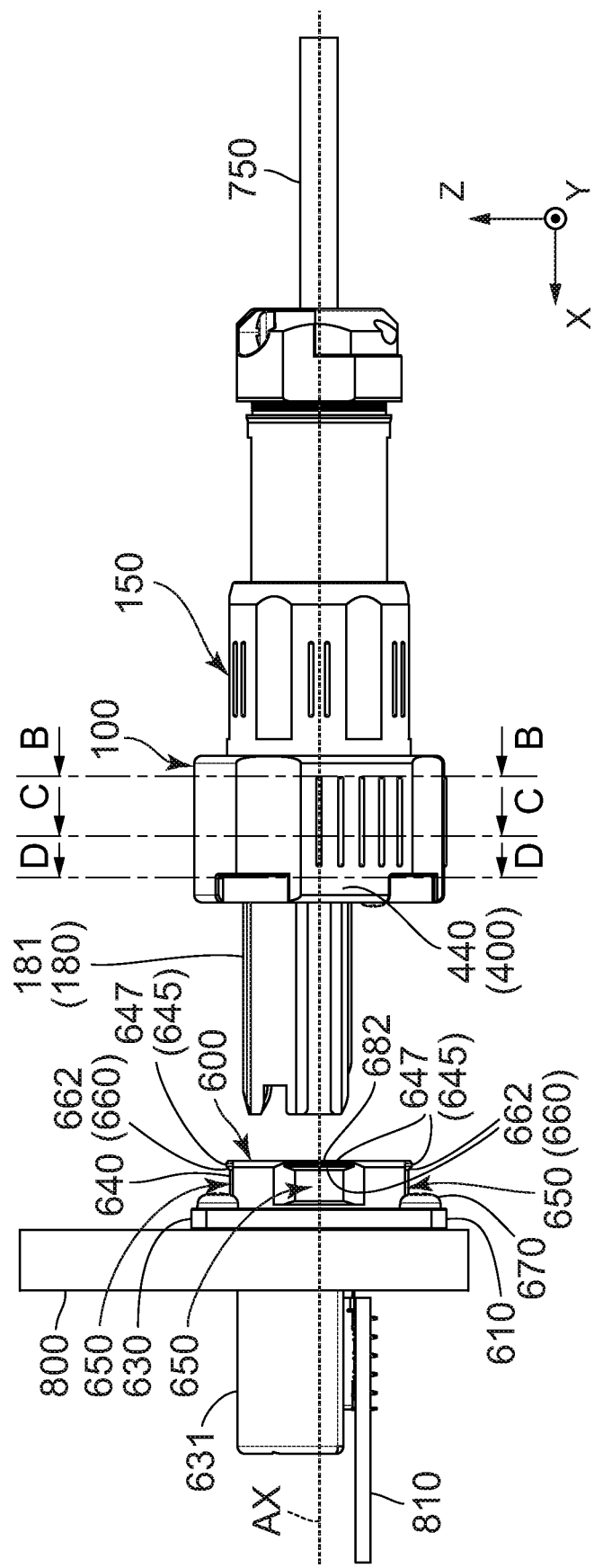
FIG. 4 is a side view showing the connector device of FIG. 1.

As shown in FIG. 4, the mating connector 600 according to the present embodiment is provided with a mating connector body 610 and fixing screws 670.

Figure 3:
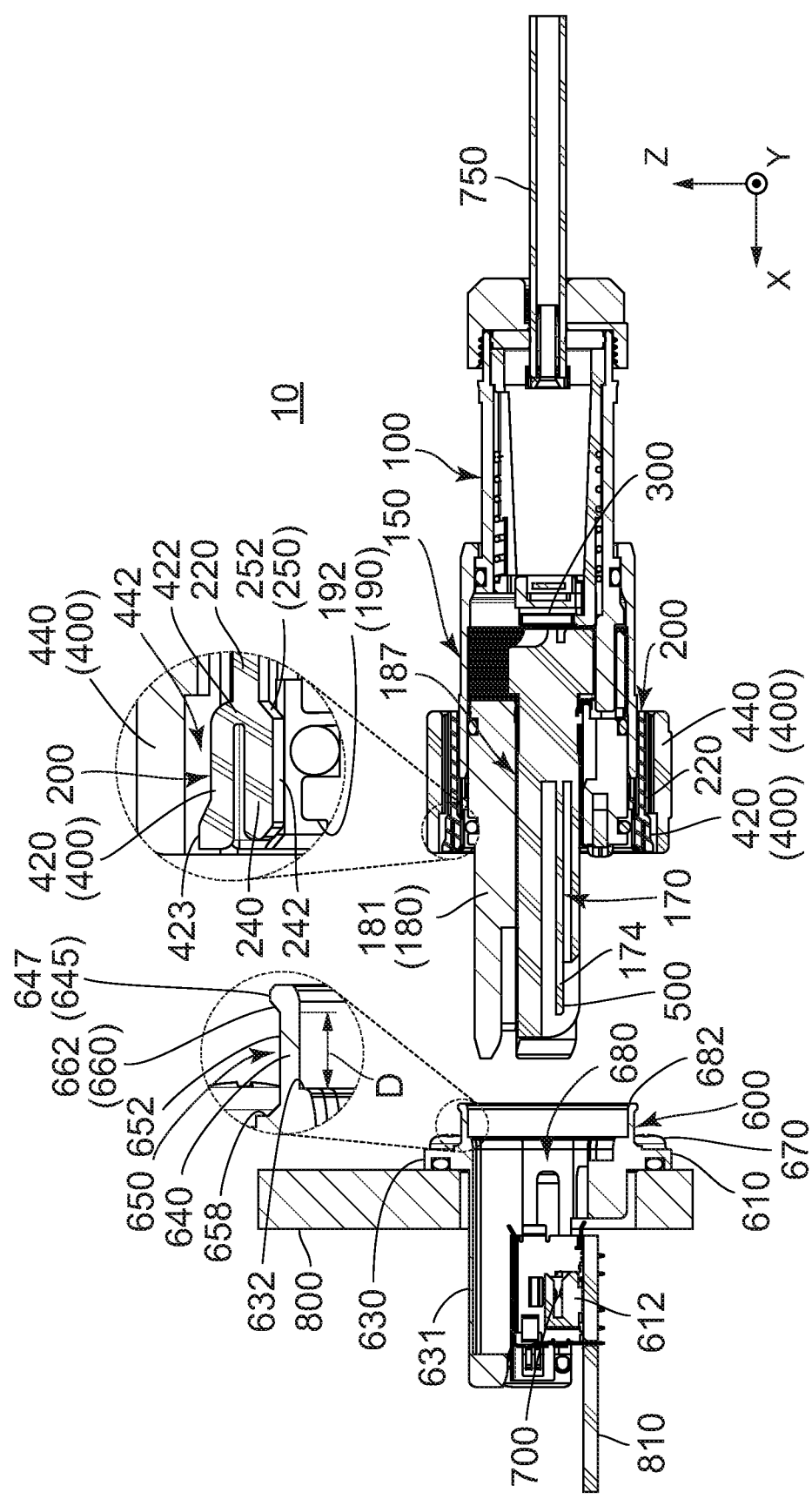
FIG. 3 is a cross-sectional view showing the connector device of FIG. 2, taken along line A-A. In the figure, a part of the connector and a part of the mating connector are shown on an enlarged scale.

As shown in FIG. 3, the mating connector body 610 of the present embodiment has a mating shell 630, a connector accommodation portion 680 and a mating electric connector 612.

As shown in FIG. 1, the mating shell 630 of the present embodiment is attached to a case 800 when the connector device 10 is used. In more detail, the mating shell 630 attached to an outer surface of the case 800 with the fixing screws 670 when the connector device 10 is used.

As shown in FIG. 3, the mating shell 630 of the present embodiment has a mating shell body 631 and a mating projecting portion 640.

As shown in FIG. 3, the mating shell body 631 of the present embodiment extends from the inside to the outside of the case 800 in the front-rear direction. As shown in FIG. 1, the mating shell body 631 is attached to the case 800 with the fixing screws 670 so that a rear end part thereof is positioned outside the case 800.

As shown in FIG. 3, the mating shell body 631 of the present embodiment is formed with an abutment portion 632. In other words, the mating shell 630 of the present embodiment is formed with the abutment portion 632. The abutment portion 632 is a surface orthogonal to the front-rear direction and directed rearward in the front-rear direction.

As shown in FIG. 1, the mating projecting portion 640 of the present embodiment has an approximately cylindrical shape having a central axis coincident with an axis AX extending in the front-rear direction. The mating projecting portion 640 is located rearward of the mating shell body 631 in the front-rear direction. The mating projecting portion 640 is provided so as to be located outside of the case 800 when the mating shell 630 is attached to the case 800. As shown in FIG. 3, the mating projecting portion 640 is located outward of the abutment portion 632 of the mating shell body 631 in an orthogonal direction orthogonal to the front-rear direction. In other words, the abutment portion 632 of the mating shell body 631 extends inward in the orthogonal direction from the mating projecting portion 640. In the present embodiment, the orthogonal direction is any one of radial directions of an imaginary circle having a center on the axis AX in a plane orthogonal to the axis AX.

As understood from FIGS. 1 and 4, the mating projecting portion 640 of the present embodiment has a plurality of depressed portions 650 and a plurality of bulge portions 645 which correspond to the depressed portions 650, respectively. In other words, the mating connector 600 of the present embodiment has a plurality of sets each of which consists of the depressed portion 650 and the bulge portion 645. In the present embodiment, the sets of the depressed portions 650 and the bulge portions 645 are four in number. In the present embodiment, the depressed portions 650 have the same shape and the same size, and the bulge portions 645 have the same shape and the same size. Each of the bulge portions 645 is located at a rear part of the depressed portion 650 corresponding thereto. The sets of the depressed portions 650 and the bulge portions 645 are arranged at regular intervals in a circumferential direction R of the imaginary circle having the center on the axis AX. However, the present invention is not limited thereto. The depressed portions 650 or the bulge portions 645 do not necessarily have the same size in the circumferential direction R about the axis AX. Moreover, the sets of the depressed portions 650 and the bulge portions 645 are not necessarily arranged at regular intervals. Furthermore, at least one set of the depressed portion 650 and the bulge portion 645 is required. In addition, the depressed portion 650 and the bulge portion 645 may be formed so as to surround an entire periphery of the mating projecting portion 640. For example, giving different sizes to the depressed portions 650 or arranging the depressed portions 650 at unequal intervals can prevent the connector 100 and the mating connector 600 from being mated with each other incorrectly. However, when the depressed portions 650 are arranged at regular intervals, the connector 100 and the mating connector 600 achieve better balance in a mated state.

As shown in FIG. 3, each of the depressed portions 650 of the present embodiment opens outward in the orthogonal direction. In other words, the depressed portion 650 is depressed inward in the orthogonal direction. The depressed portion 650 forms, in part, an outer surface of the mating projecting portion 640 in the orthogonal direction. A front end of the depressed portion 650 is coupled to the mating shell body 631 in the front-rear direction.

As shown in FIG. 3, each of the depressed portions 650 of the present embodiment has a front surface 658 and a bottom surface 652. The front surface 658 consists of a surface orthogonal to the front-rear direction and directed rearward and a surface directed outward in the orthogonal direction and rearward in the front-rear direction. The front surface 658 is located forward of the bottom surface 652 in the front-rear direction. The bottom surface 652 is orthogonal to the orthogonal direction and directed outward in the orthogonal direction. The bottom surface 652 forms, in part, a cylindrical surface having a central axis coincident with the axis AX. The bottom surface 652 is located forward of the bulge portion 645 in the front-rear direction. The bottom surface 652 is located between the front surface 658 and the bulge portion 645 in the front-rear direction.

As understood from FIG. 3, each of the bulge portions 645 protrudes in the orthogonal direction at the rear part of the depressed portion 650 corresponding thereto. A size of the bulge portion 645 in the orthogonal direction is smaller than a size (depth) of the depressed portion 650 in the orthogonal direction. The bulge portion 645 defines, in part, a rear end of the mating projecting portion 640 in the front-rear direction. In other words, the bulge portion 645 defines, in part, a rear end of the mating shell 630 in the front-rear direction. The bulge portion 645 is tapered rearward.

As shown in FIG. 3, each of the bulge portions 645 of the present embodiment has an outer surface 647 and an end face 662.

As shown in FIG. 3, the outer surface 647 of the present embodiment is a surface orthogonal to the orthogonal direction and directed outward in the orthogonal direction. The outer surface 647 is located outward of the bottom surface 652 of the depressed portion 650 in the orthogonal direction.

As shown in FIG. 3, the end face 662 of the present embodiment is directed outward in the orthogonal direction and forward in the front-rear direction. In other word, the end face 662 is an intersecting surface 662 intersecting with both of the front-rear direction and the orthogonal direction. The end face 662 is also a rear surface 662 defining, in part, a rear end of the depressed portion 650 corresponding thereto.

As shown in FIG. 3, the bulge portion 645 of the present embodiment is provided with a mating locking portion 660. In other words, the mating locking portion 660 of the present embodiment is provided to the bulge portion 645. The mating locking portion 660 is provided to a front part of the bulge portion 645.

As described above, in the present embodiment, the mating connector 600 is provided with the mating connector body 610, the mating shell body 631 is formed with the abutment portion 632, and the bulge portion 645 is provided with the mating locking portion 660. In other words, the mating connector 600 according to the present embodiment is provided with the mating connector body 610, the mating locking portion 660 and the abutment portion 632. However, the present invention is not limited thereto. The mating connector 600 should be provided with at least one mating locking portion 660 and an abutment portion 632.

As shown in FIG. 3, in the mating connector 600 of the present embodiment, relative positions of the mating locking portion 660 and the abutment portion 632 in the front-rear direction are fixed. In more detail, in the mating connector 600 of the present embodiment, the mating locking portion 660 is located rearward of the abutment portion 632 in the front-rear direction, and the mating locking portion 660 and the abutment portion 632 are fixed so as to be located apart from each other at a distance D in the front-rear direction.

As shown in FIG. 3, the mating locking portion 660 of the present embodiment has the intersecting surface 662 intersecting with both of the front-rear direction and the orthogonal direction.

As shown in FIG. 3, the intersecting surface 662 of the mating locking portion 660 of the present embodiment is directed outward in the orthogonal direction and forward in the front-rear direction. The intersecting surface 662 of the mating locking portion 660 is also the end face 662 of the bulge portion 645. In other words, the intersecting surface 662 of the mating locking portion 660 is one surface of the bulge portion 645.

As shown in FIG. 3, the connector accommodation portion 680 of the present embodiment is a space extending forward from a rear end of the mating connector body 610 and has an opening portion 682 at the rear end.

As shown in FIG. 3, the mating electric connector 612 of the present embodiment is fixed on a circuit board 810 disposed in the case 800 when the connector device 10 is used.

As shown in FIG. 3, the mating electric connector 612 of the present embodiment has a mating terminal 700. In other words, the mating connector 600 of the present embodiment has the mating terminal 700. The mating terminal 700 of the present embodiment is made of metal.

As shown in FIGS. 1, 15 and 22, the connector 100 of the present embodiment is mateable with and removable from the mating connector 600 along the front-rear direction.

As shown in FIG. 3, the connector 100 of the present embodiment is provided with a connector body 150, a locking member 200 and a retaining member 440.

As shown in FIG. 3, the connector body 150 of the present embodiment is provided with a holding member 180, an optical connector 300 and an optical module 170.

Figure 5:
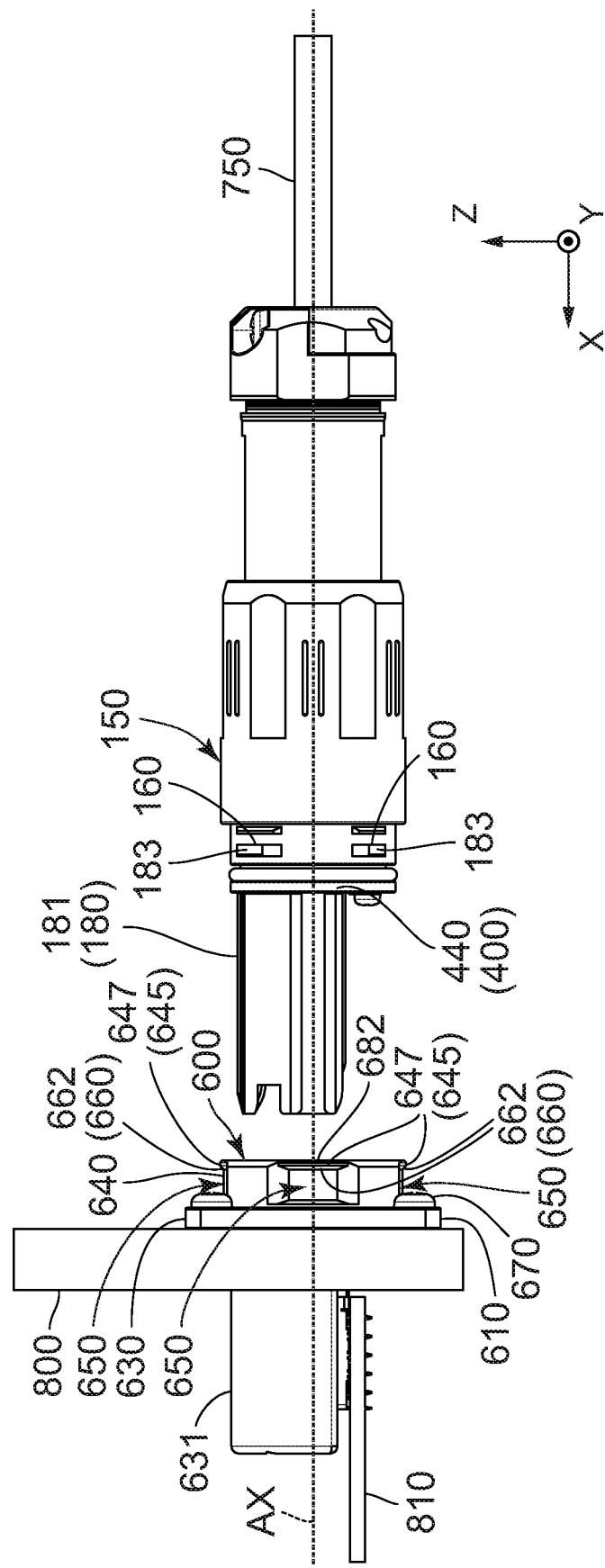
FIG. 5 is another side view showing the connector device of FIG. 4. In the figure, a retaining portion and a locking member which are included in the connector of the connector device are omitted.

Referring to FIGS. 3 and 5, the holding member 180 of the present embodiment is made of electrical insulator and has an insertion portion 181, a protruding portion 190, protrusions 183, front-rear-movement-regulating portions 160 and an optical-module-accommodation portion 187. In other words, the connector body 150 of the present embodiment is provided with the front-rear-movement-regulating portions 160.

Referring to FIGS. 1 and 3, the insertion portion 181 of the present embodiment extends in the front-rear direction and defines a front end of the holding member 180.

As shown in FIG. 3, the protruding portion 190 of the present embodiment protrudes in a direction orthogonal to the front-rear direction. The protruding portion 190 is located rearward of the insertion portion 181 in the front-rear direction. The protruding portion 190 is located outward of the insertion portion 181 in the orthogonal direction. The protruding portion 190 has a front surface 192 directed forward in the front-rear direction. The front surface 192 of the protruding portion 190 is a surface orthogonal to the front-rear direction and directed forward in the front-rear direction. The front surface 192 of the protruding portion 190 functions as a receiving portion 192. In other words, the connector 100 is provided with the receiving portion 192.

As shown in FIG. 5, each of the protrusions 183 of the present embodiment protrudes outward in the orthogonal direction. Referring to FIGS. 3 and 5, the protrusion 183 is located rearward of the protruding portion 190 in the front-rear direction. The protrusion 183 is located outward of the protruding portion 190 in the orthogonal direction. The protrusion 183 has a rear surface 160. The rear surface 160 of the protrusion 183 is a surface orthogonal to the front-rear direction and directed rearward in the front-rear direction. The rear surface 160 of the protrusion 183 functions as the front-rear-movement-regulating portion 160.

As shown in FIG. 3, the optical connector 300 of the present embodiment connects an optical fiber cable 750 and the optical module 170 to each other. In other words, the optical connector 300 is attached to the optical fiber cable 750, and the optical connector 300 is formed so as to be attachable to and detachable from the optical module 170.

As shown in FIG. 3, the optical module 170 of the present embodiment has a photoelectric conversion portion (not shown) and an electric connector 174. The photoelectric conversion portion converts optical signals and electric signals to each other between the optical connector 300 and the electric connector 174.

Referring to FIG. 3, the electric connector 174 of the present embodiment inputs and outputs the electric signals to the photoelectric conversion portion (not shown). The electric connector 174 of the present embodiment has a terminal 500. In other words, the connector 100 of the present embodiment has the terminal 500. The terminal 500 of the present embodiment is made of metal.

As shown in FIG. 3, the locking member 200 of the present embodiment is attached to the connector body 150.

In more detail, the locking member 200 is attached outward of the holding member 180 of the connector body 150 in the orthogonal direction. In other words, the locking member 200 covers the connector body 150 at least in part. Since the locking member 200 is formed so as to cover the connector body 150, increase of a size of the connector 100 in the direction of the axis AX, which is brought by providing the locking member 200, can be avoided.

Figure 6:
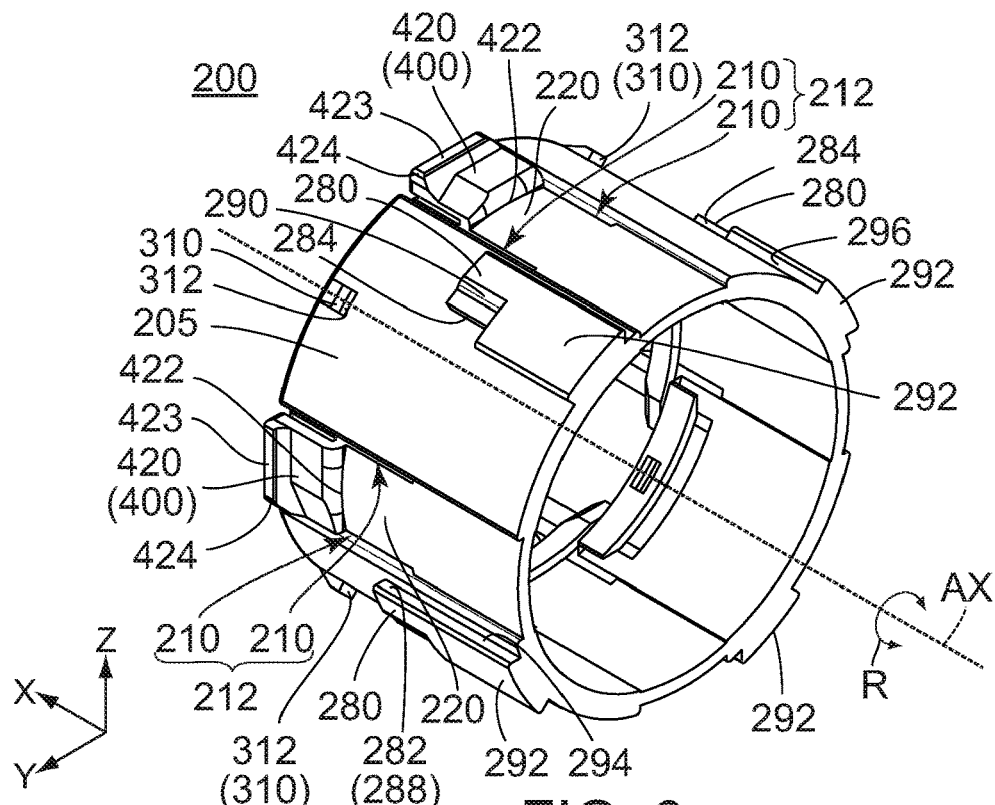
FIG. 6 is a perspective view showing the locking member included in the connector of the connector device of FIG. 1.
Figure 7:
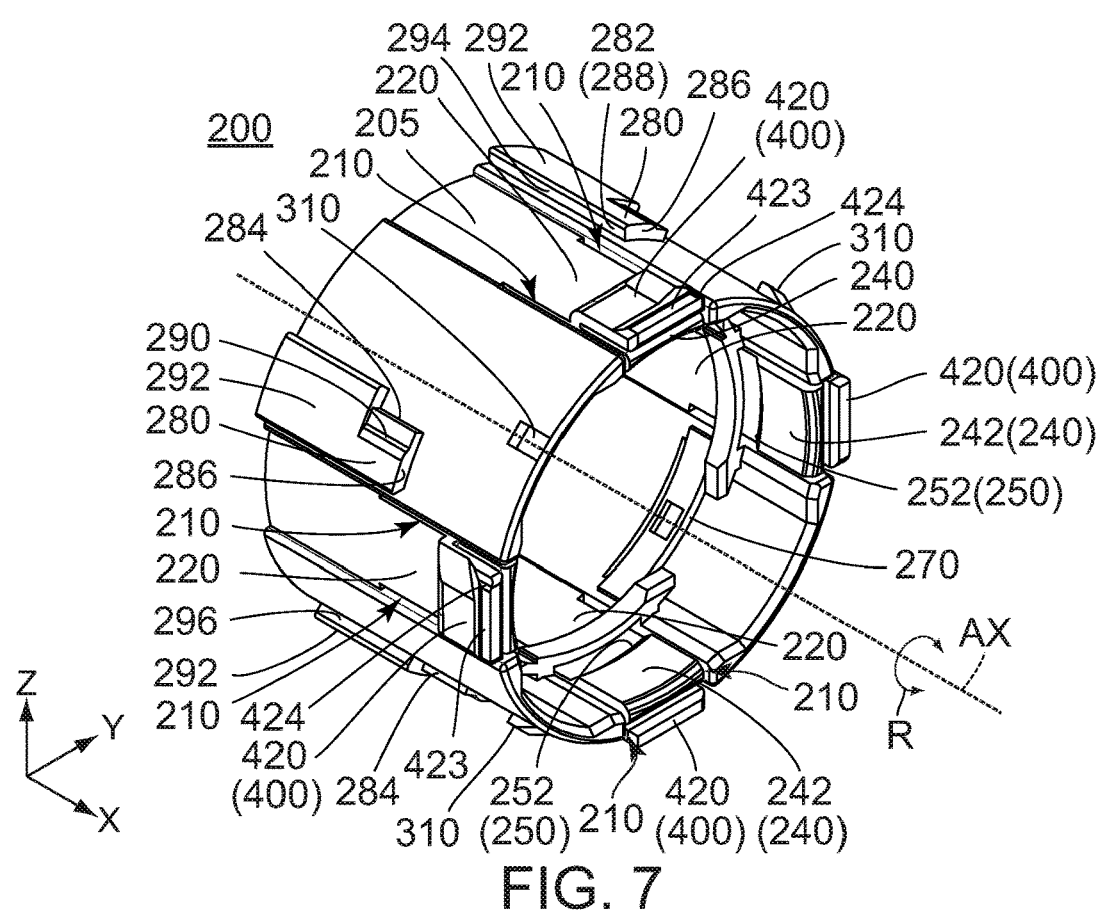
FIG. 7 is another perspective view showing the locking member of FIG. 6.
Figure 8:
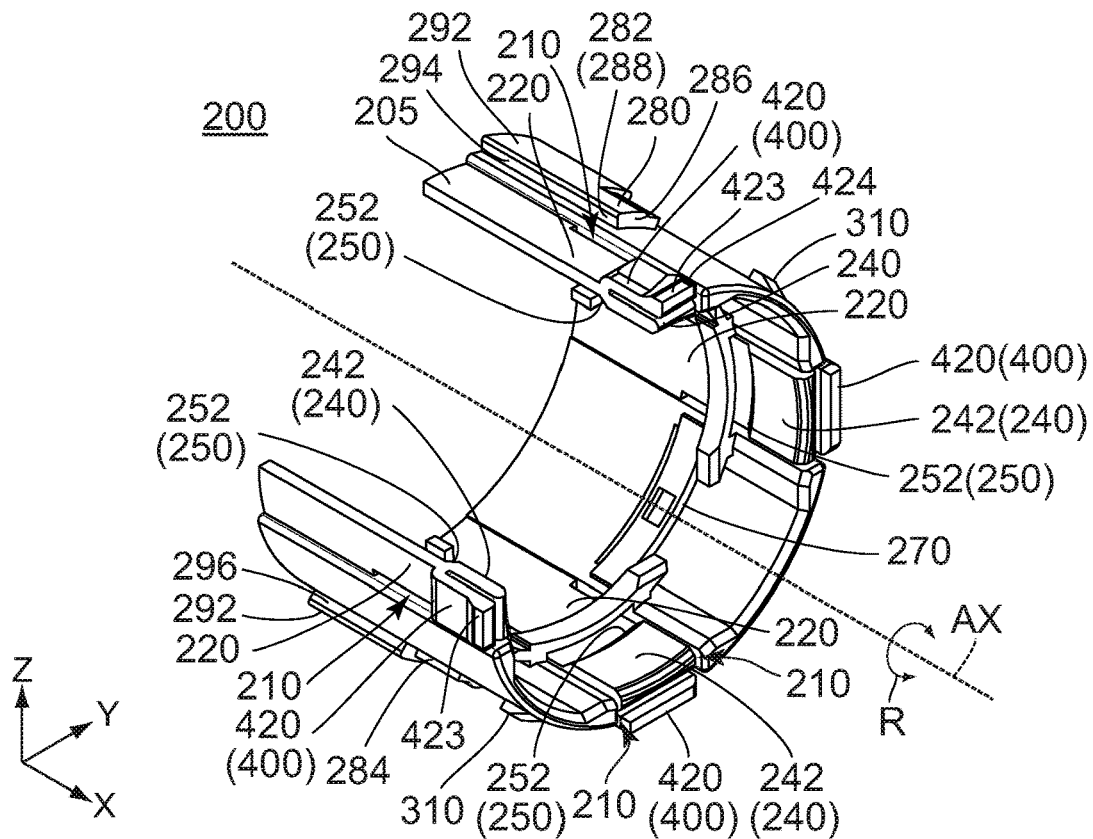
FIG. 8 is a cutaway perspective view showing the locking member of FIG. 7.

As understood from FIGS. 6, 7 and 8, the locking member 200 of the present embodiment has a sidewall 205, a plurality of slits 210, a plurality of supporting portions 220, a plurality of projecting portions 240, a plurality of locking portions 250, a plurality of additional resilience portions 420 and a plurality of front-rear-movement-regulated portions 270. In other words, the locking member 200 of the present embodiment has the supporting portions 220, the locking portions 250 and the additional resilience portions 420. Moreover, the locking member 200 of the present embodiment is provided with the front-rear-movement-regulated portions 270. In more detail, the locking member 200 of the present embedment has eight slits 210, four supporting portions 220, four projecting portions 240, four additional resilience portions 420 and four front-rear-movement-regulated portions 270. It should be noted that the projecting portions 240 correspond to the depressed portions 650 of the mating projecting portion 640, respectively, and the number and arrangement of them depend on the number and arrangement of the depressed portions 650.

As shown in FIGS. 6, 7 and 8, the sidewall 205 of the present embodiment has an approximately cylindrical shape having a central axis coincident with the axis AX.

As shown in FIGS. 6, 7 and 8, each of the slits 210 of the present embodiment is a groove extending rearward from a front end of the sidewall 205 of the locking member 200. In more detail, the slit 210 pierces the sidewall 205 of the locking member 200 in the orthogonal direction. Moreover, the slit 210 does not reach a rear end of the sidewall 205 of the locking member 200. The eight slits 210 of the present embodiment are divided into four slit pairs 212 each of which consist of two of the slits 210.

As shown in FIGS. 6, 7 and 8, the supporting portions 220 of the present embodiment are parts of the sidewall 205, which has the approximately cylindrical shape, of the locking member 200. In more detail, the four supporting portions 220 correspond to the slit pairs 212, respectively, and each of the supporting portions 220 is located between the slits of the slit pair 212 corresponding thereto in the circumferential direction R about the axis AX. Moreover, the supporting portions 220 are arranged at regular intervals in the circumferential direction R about the axis AX. The supporting portions 220 have resilience and support the locking portions 250.

As shown in FIGS. 3, 7, and 8, each of the projecting portions 240 of the present embodiment protrudes inward from the supporting portion 220 in the orthogonal direction. In other words, the connector 100 of the present embodiment has the projecting portion 240 protruding inward from the supporting portion 220 in the orthogonal direction. The projecting portion 240 is located at a front end of the supporting portion 220. The projecting portion 240 is tapered forward.

As shown in FIGS. 3, 7 and 8, each of the projecting portions 240 of the present embodiment has an inner surface 242 and the locking portion 250. In other words, the projecting portion 240 is provided with the locking portion 250.

As shown in FIG. 3, the inner surface 242 of the present embodiment is a curved surface orthogonal to the orthogonal direction and directed inward in the orthogonal direction.

As shown in FIG. 3, the locking portion 250 of the present embodiment is located at a rear end of the projecting portion 240 in the front-rear direction.

As understood from FIGS. 3 and 6 to 8, the locking portions 250 of the present embodiment are supported by the supporting portions 220, respectively. The locking portions 250 are arranged at regular intervals in the circumferential direction R about the axis AX. Each of the locking portions 250 of the present embodiment is movable in the orthogonal direction owing to resilient deformation of the supporting portion 220. However, the present invention is not limited thereto. The locking portion 250 should be movable at least in the orthogonal direction owing to the resilient deformation of the supporting portion 220.

As shown in FIG. 3, each of the locking portions 250 has an intersecting surface 252 intersecting with both of the front-rear direction and the orthogonal direction. Since the mating locking portion 660 has the intersecting surface 662 as described above, the intersecting surfaces 252 and 662 are provided to the locking portion 250 and the mating locking portion 660, respectively. The intersecting surface 252 of the locking portion 250 is directed inward in the orthogonal direction and rearward in the front-rear direction. In more detail, referring to FIGS. 7 and 8, all of the intersecting surfaces 252 of the locking portions 250 are parts of a common conical surface having a central axis coincident with the axis AX.

Referring to FIGS. 3, 7 and 8, each of the additional resilience portions 420 of the present embodiment is a spring extending from the supporting portion 220 like a cantilever.

As shown in FIGS. 3 and 6, each of the additional resilience portions 420 of the present embodiment has a connection portion 422, a chamfer 424 and a pressed portion 423.

As shown in FIG. 3, the connection portion 422 is connected to the supporting portion 220. The connection portion 422 is located outward of the locking portion 250 in the orthogonal direction.

As understood from FIG. 6, the chamfer 424 of the present embodiment is provided on a front-end portion of the additional resilience portion 420. The chamfer 424 is parallel to the front-rear direction and intersects with the orthogonal direction. In more detail, the chamfer 424 is directed outward in the orthogonal direction and directed in one direction (a first turning direction) of the circumferential direction R about the axis AX.

As shown in FIGS. 6 and 7, the pressed portion 423 of the present embodiment is a flat surface having its part orthogonal to the orthogonal direction and directed outward in the orthogonal direction. The pressed portion 423 is located at the front-end portion of the additional resilience portion 420. Moreover, the pressed portion 423 is adjacent to the chamfer 424 corresponding thereto in the circumferential direction R about the axis AX. In more detail, the pressed portion 423 is located, in the circumferential direction R about the axis AX, on an opposite side in the direction in which the chamfer 424 is directed.

As shown in FIGS. 7 and 8, each of the front-rear-movement regulated portions 270 of the present embodiment is located inward of the sidewall 205 of the locking member 200 in the orthogonal direction. The front-rear-movement regulated portion 270 is a surface directed forward in the front-rear direction. Referring to FIGS. 4, 5, 7 and 8, the front-rear-movement-regulated portion 270 is located rearward of the front-rear-movement-regulating portion 160 of the holding member 180 of the connector body 150 in the front-rear direction.

Referring to FIGS. 6 to 8, the locking member 200 is further provided with a plurality of regulating portions 280 each of which protrudes outward in the orthogonal direction. In the present embodiment, the regulating portions 280 are four in number. The regulating portions 280 are arranged at regular intervals in the circumferential direction R about the axis AX. Moreover, the regulating portions 280 are arranged apart from the additional resilience portions 420 in the front-rear direction and apart from the additional resilience portions 420 in the circumferential direction R about the axis AX. According to this structure, production of the locking member 200 using molding can be carried out easily.

As shown in FIGS. 6 to 8, each of the regulating portions 280 has a first regulating surface 282, a second regulating surface 284 and a front surface 286. The first regulating surface 282 extends in the front-rear direction and is directed in a second turning direction of the circumferential direction R about the axis AX. The second turning direction is a clockwise direction when the locking member 200 is viewed from behind in the front-rear direction. The second regulating surface 284 extends in the front-rear direction and is directed in the first turning direction of the circumferential direction R about the axis AX. The first turning direction is a counter clockwise direction when the locking member 200 is viewed from behind in the front-rear direction. The front surface 286 extends in the circumferential direction R about the axis AX and is directed forward in the front-rear direction. As described later, the first regulating surface 282 functions as a first regulating portion 282, and the second regulating surface 284 functions as a second regulating portion 284. Moreover, the front surface 286 functions as a fourth regulating portion 286. In other words, the locking member 200 is provided with the first regulating portion 282, the second regulating portion 284 and the fourth regulating portion 286.

As shown in FIGS. 6 and 7, each of the regulating portions 280 further has a provisional regulating portion 288. In the present embodiment, the provisional regulating portion 288 is a part of the first regulating surface 282. However, the present invention is not limited thereto. The provisional regulating portion 288 may be provided separately from the first regulating surface 282.

As shown in FIGS. 6 and 7, each of the regulating portions 280 is provided with a guide portion 290. In the present embodiment, the guide portion 290 is adjacent to the second regulating surface 284 and is a depressed portion depressed inward in the orthogonal direction.

As shown in FIGS. 6 to 8, the locking member 200 is further formed with a plurality of platform-shaped supporting portions 292 each of which protrudes outward in the orthogonal direction. In the present embodiment, the platform-shaped supporting portions 292 are four in number. The platform-shaped supporting portions 292 correspond to the regulating portions 280, respectively, and each of them is contiguous to the regulating portion 280 corresponding thereto. Each of the platform-shaped supporting portions 292 has a pair of side surfaces 294 and 296. One of them, the side surface 294, forms a flat surface together with the first regulating surface 282 of the regulating portion 280 corresponding thereto. The remaining one, the side surface 296, is located, in the circumferential direction R about the axis AX, outward of the second regulating surface 284 of the regulating portion 280 corresponding thereto.

Referring to FIGS. 6 to 8, the locking member 200 is further formed with protruding portions 310 each of which protrudes outward in the orthogonal direction. The protruding portions 310 are provided at a front-end portion of the locking member 200 in the front-rear direction. Each of the protruding portions 310 is orthogonal to the front-rear direction and has a rear surface 312 directed rearward in the front-rear direction. As described later, the rear surface 312 functions as a fifth regulating portion 312. Thus, the locking member 200 is further provided with the fifth regulating portion 312.

As shown in FIG. 3, the locking member 200 is located inward of the retaining member 440 in the orthogonal direction. In other words, the retaining member 440 is located outward of the locking member 200 in the orthogonal direction. In the present embodiment, the retaining member 440 covers the retaining member 440 entirely in the orthogonal direction. Accordingly, each of the additional resilience portions 420 of the locking member 200 is located inward of the retaining member 440 in the orthogonal direction. The retaining member 440 is attached to the locking member 200 so as to be movable with respect to the locking member 200 between a first position and a second position in a movable direction perpendicular to both of the front-rear direction and the orthogonal direction. In the present embodiment, the movable direction of the retaining member 440 coincides with the circumferential direction R about the axis AX. In other words, the retaining member 440 is attached to the locking member 200 so as to be turnable in the circumferential direction R about the axis AX. In the present embodiment, the movable direction of the retaining member 440 from the first position to the second position is the first turning direction. Moreover, the movable direction of the retaining member 440 from the second position to the first position is the second turning direction.

Figure 9:
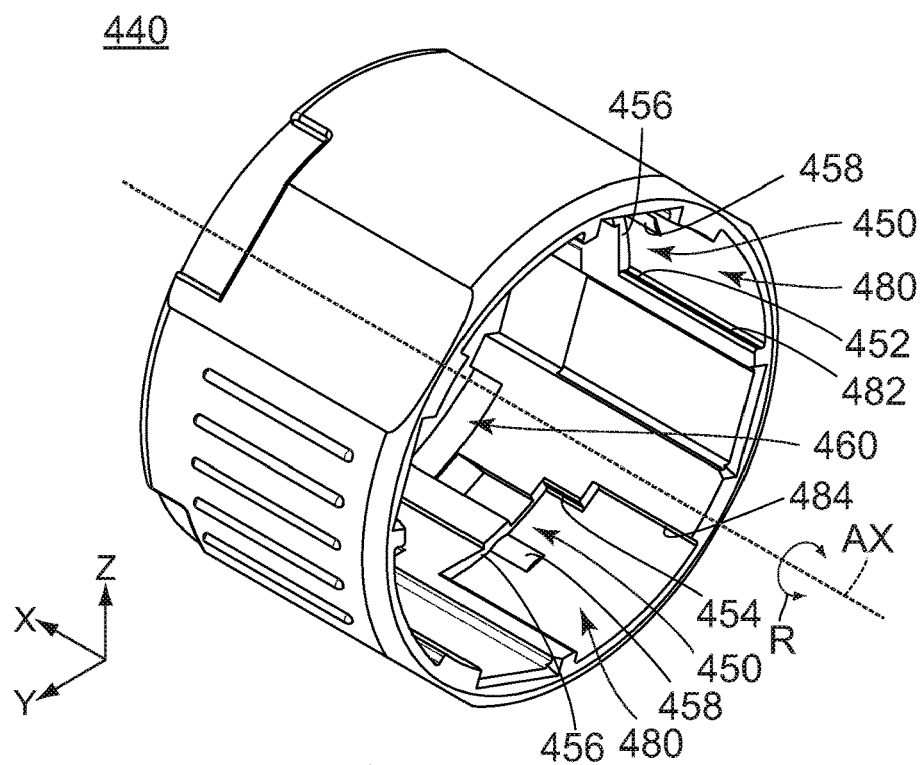
FIG. 9 is a perspective view showing the retaining portion included in the connector of the connector device of FIG. 1.
Figure 10:
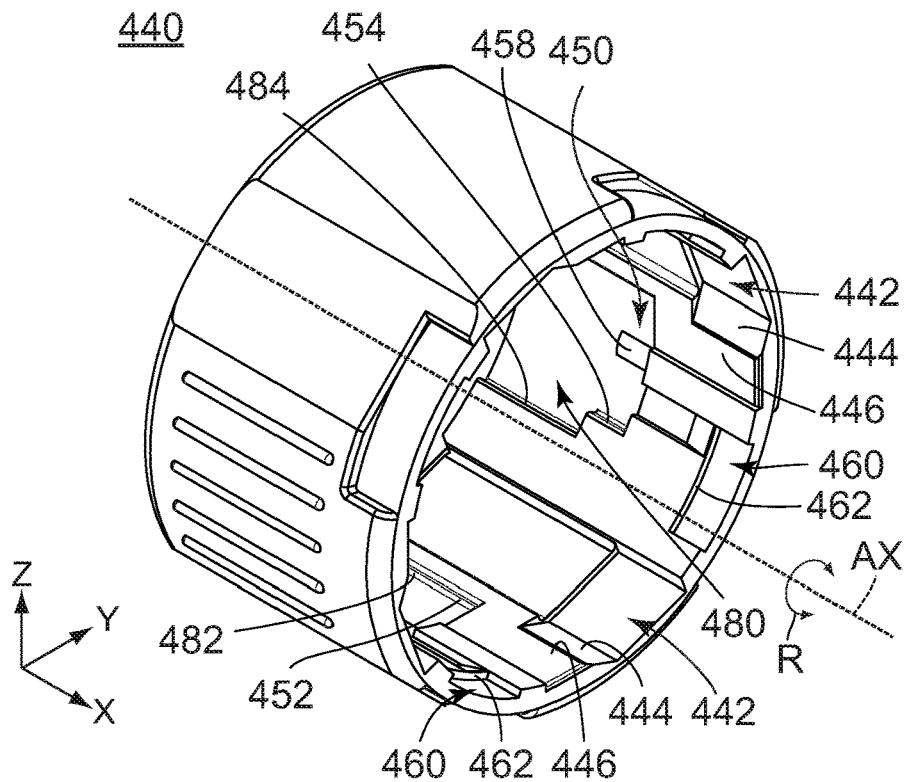
FIG. 10 is another perspective view showing the retaining portion of FIG. 9.
Figure 11:
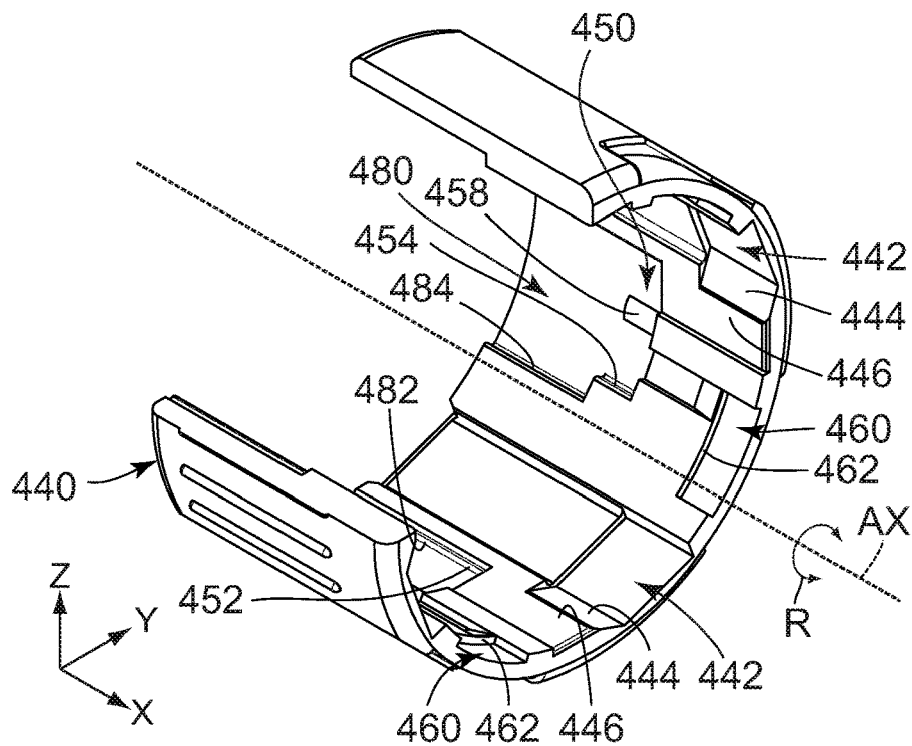
FIG. 11 is a cutaway perspective view showing the retaining portion of FIG. 10.

As shown in FIGS. 9 to 11, the retaining member 440 of the present embodiment has an approximately cylinder shape having a center on the axis AX. The retaining member 440 has a plurality of additional-resilience-portion-accommodation portions 442, a plurality of inclined surfaces 444 and a plurality of pressing portions 446. In more detail, the retaining member 440 has four additional-resilience-portion-accommodation portions 442, four inclined surfaces 444 and four pressing portions 446. Here, the four additional-resilience-portion-accommodation portions 442 correspond to the four additional resilience portions 420 of the locking member 200, respectively. Moreover, the four additional-resilience-portion-accommodation portions 442 correspond to the four inclined surfaces 444, respectively. Furthermore, the four inclined surfaces 444 correspond to the four pressing portions 446, respectively.

Figure 14:
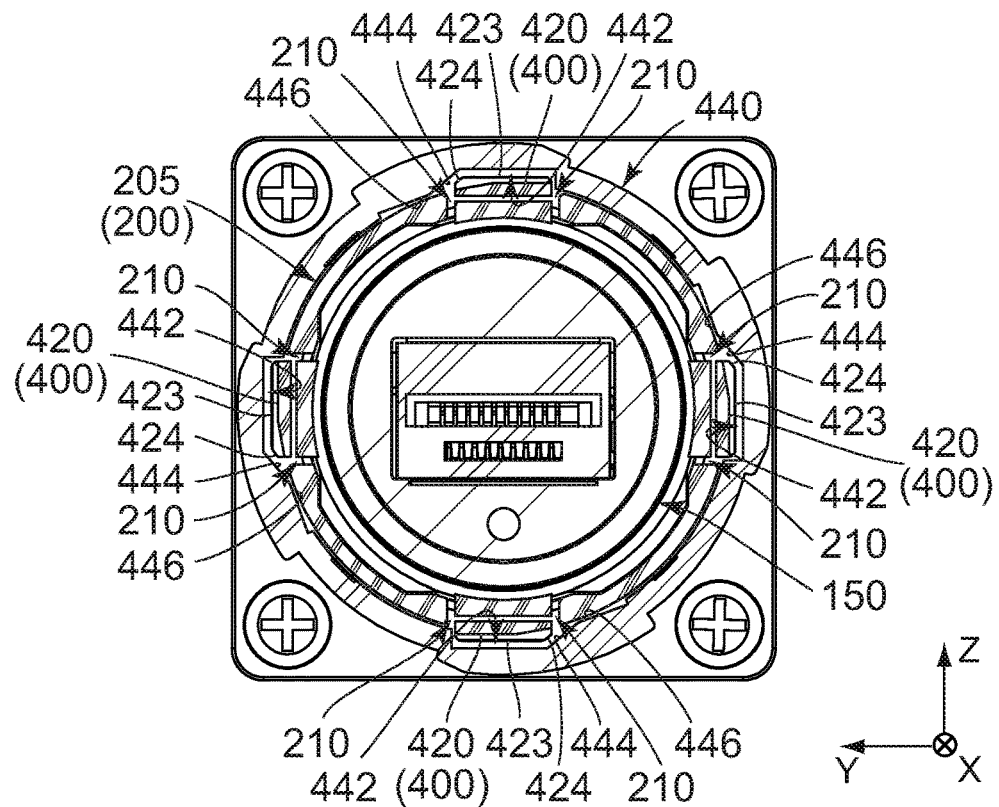
FIG. 14 is a cross-sectional view showing the connector device of FIG. 4, taken along line D-D.
Figure 21:
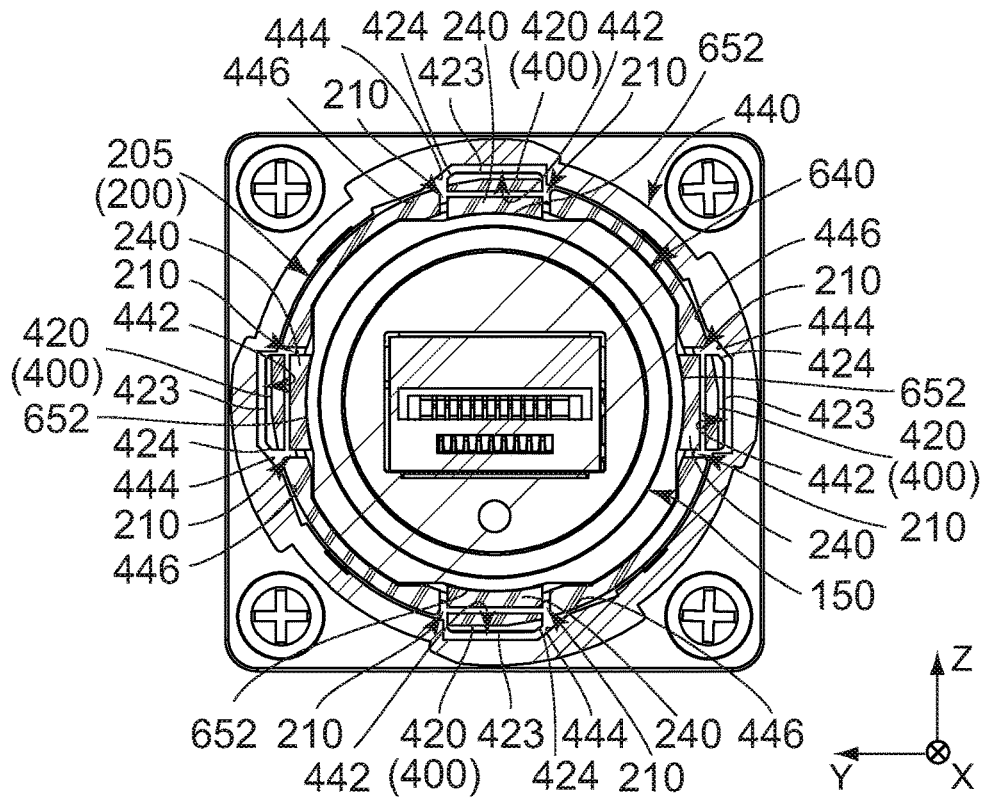
FIG. 21 is a cross-sectional view showing the connector device of FIG. 18, taken along line H-H.

As shown in FIGS. 9 to 11, each of the additional-resilience-portion-accommodation portions 442 of the present embodiment is a space extending rearward from a front end of the retaining member 440. As shown in FIGS. 14 and 21, when the retaining member 440 is positioned in the second position, the additional resilience portions 420 of the locking member 200 are accommodated in the additional-resilience-portion-accommodation portions 442.

As shown in FIGS. 9 to 11, each of the pressing portions 446 of the present embodiment is a flat surface including its part perpendicular to the orthogonal direction and directed inward in the orthogonal direction. The pressing portion 446 is located at a front-end portion of the retaining member 440. In the orthogonal direction, the pressing portion 446 is located inward of the additional-resilience-portion accommodation portion 442.

As shown in FIGS. 9 to 11, the inclined surface 444 of the present embodiment is located between the additional-resilience-portion accommodation portion 442 corresponding thereto and the pressing portion 446 corresponding thereto in the circumferential direction R about the axis AX. The inclined surface 444 is in parallel to the front-rear direction and intersects with the orthogonal direction. In more detail, the inclined surface 444 is directed inward in the orthogonal direction and directed in the second turning direction of the circumferential direction R about the axis AX.

As described above, in the present embodiment, the locking member 200 of the connector 100 has the additional resilience portions 420, and the connector 100 has the retaining member 440. In other words, the connector device 10 further has a maintaining mechanism 400 provided with the additional resilience portions 420 and the retaining member 440.

Moreover, as described above, in the present embodiment, the locking member 200 has the plurality of the supporting portions 220, each of the projecting portions 240 of the locking member 200 is provided with the locking portion 250, and the connector 100 is provided with the receiving portion 192. In other words, the connector 100 of the present embodiment is provided with the plurality of the supporting portions 220, the plurality of the locking portions 250 and the receiving portion 192. In more detail, the connector 100 of the present embodiment is provided with the four supporting portions 220, the four locking portions 250 and the receiving portion 192. It should be noted that the present invention is not limited thereto. The connector 100 should be provided at least one supporting portion 220, at least one locking portion 250 and a receiving portion 192.

Referring again to FIGS. 9 to 11, the retaining member 440 is further provided with a plurality of regulating-portion-accommodation portions (accommodation portions) 450. In the present embodiment, the retaining member 440 is provided with four regulating-portion-accommodation portions 450. The regulating-portion-accommodation portions 450 correspond to the regulating portions 280 of the locking member 200, respectively. Accordingly, the regulating-portion-accommodation portions 450 are arranged at regular intervals in the circumferential direction R about the axis AX and arranged in the approximately middle of the retaining member 440 in the front-rear direction. Each of the regulating-portion-accommodation portions 450 accommodates the regulating portion 280 corresponding thereto.

As shown in FIGS. 9 to 11, the retaining member 440 is further provided with a plurality of platform-shaped-supporting-portion-accommodation portions 480. The platform-shaped-supporting-portion-accommodation portions 480 correspond to the regulating-portion-accommodation portions 450, respectively. Each of the platform-shaped-supporting-portion-accommodation portions 480 is located rearward of the regulating-portion-accommodation portion 450 corresponding thereto in the front-rear direction and communicates with the regulating-portion-accommodation portion 450 corresponding thereto. Each of the platform-shaped-supporting-portion-accommodation portions 480 accommodates the platform-shaped-supporting portion 292 corresponding thereto.

As shown in FIGS. 9 to 11, each of the regulating-portion-accommodation-portions 450 has a first inner surface (a first regulated portion) 452 and a second inner surface (a second regulated portion) 454. Moreover, each of the regulating-portion-accommodation portions 450 has a front surface 456 extending in the circumferential direction R about the axis AX. The first inner surface 452 is directed in the first turning direction, and the second inner surface 454 is directed in the second turning direction. Moreover, the front surface 456 is directed rearward in the front-rear direction. Since the regulating-portion-accommodation portions 450 are arranged at regular intervals in the circumferential direction R about the axis AX, the first inner surfaces 452 are arranged at regular intervals in the circumferential direction R in the present embodiment. Similarly, the second inner surfaces 454 are also arranged in regular intervals in the circumferential direction R.

As shown in FIGS. 9 to 11, each of the platform-shaped-supporting-portion-accommodation portions 480 has a pair of inner side surfaces 482 and 484 extending in the front-rear direction. One of them, the inner side surface 482, is directed in the first turning direction of the circumferential direction R about the axis AX, and the remaining one, the inner side surface 484, is directed in the second turning direction of the circumferential direction R about the axis AX. Moreover, the inner side surface 482 forms the same surface as the first inner surface 452 of the regulating-portion accommodation portion 450 corresponding thereto. On the other hand, the inner side surface 484 is located outward of the second inner surface 454 of the regulating-portion-accommodation portion 450 corresponding thereto in the circumferential direction R about the axis AX.

Figure 12:
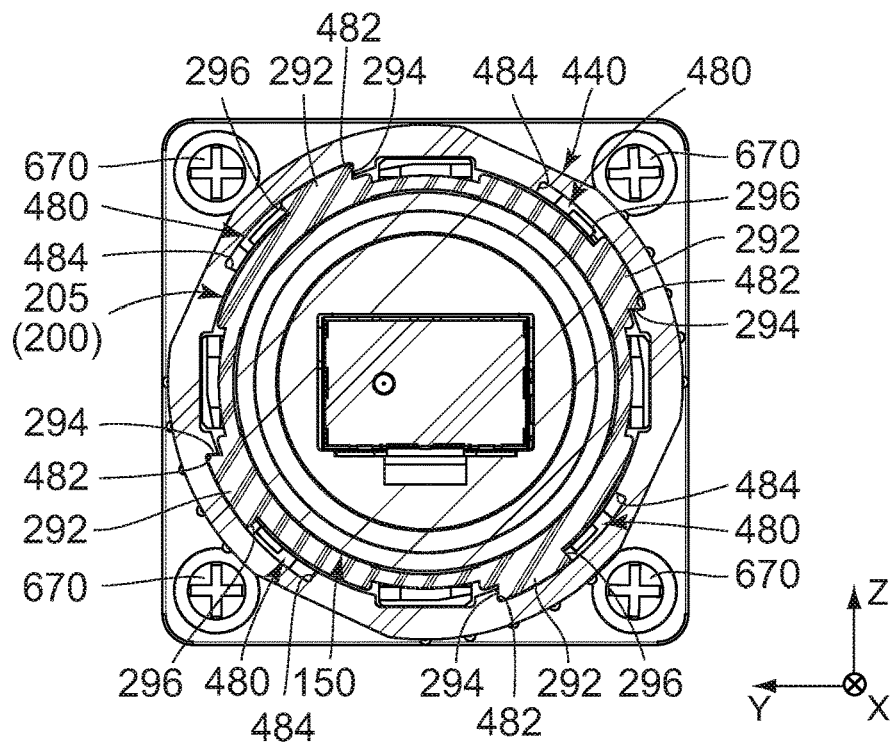
FIG. 12 is a cross-sectional view showing the connector device of FIG. 4, taken along line B-B.
Figure 13:
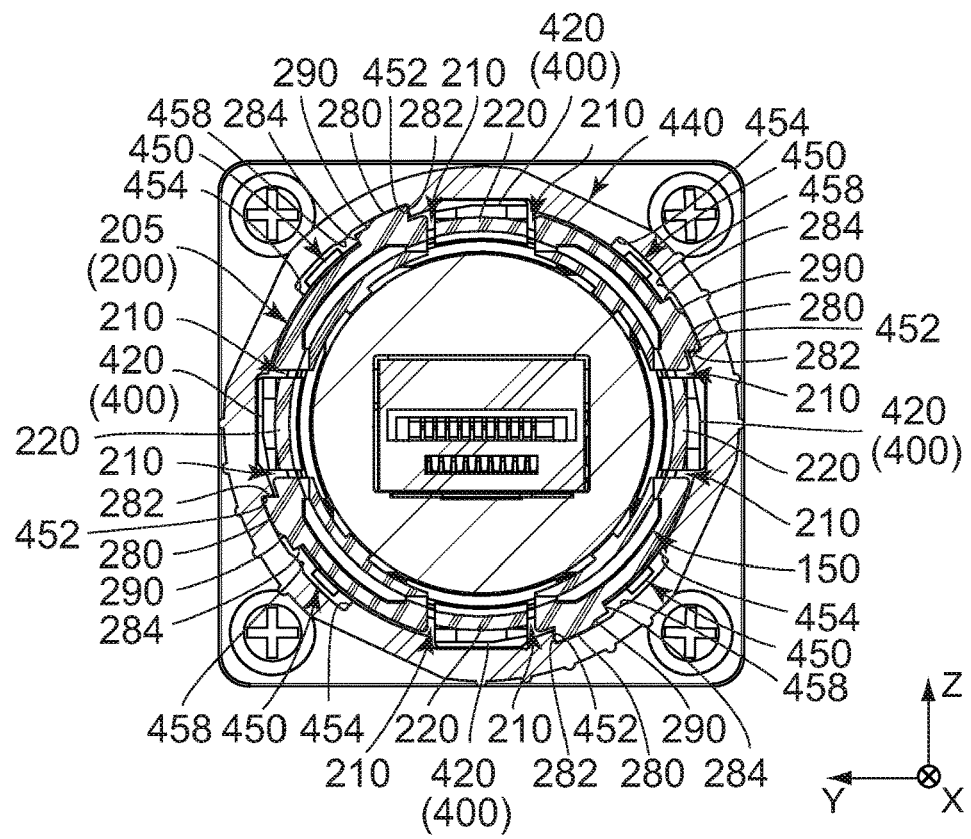
FIG. 13 is a cross-sectional view showing the connector device of FIG. 4, taken along line C-C.
Figure 19:
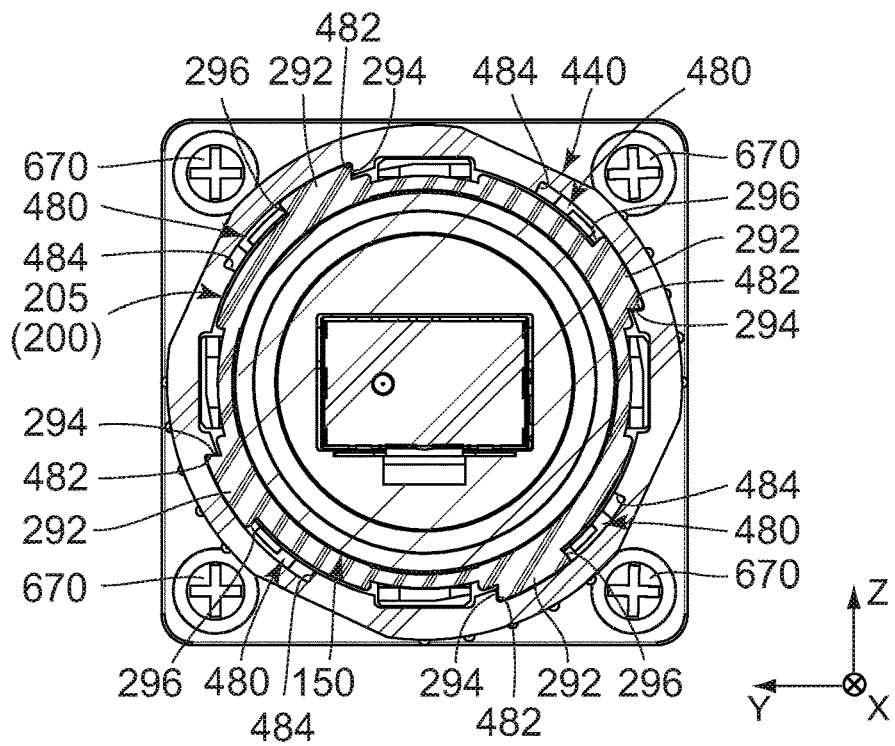
FIG. 19 is a cross-sectional view showing the connector device of FIG. 18, taken along line F-F.
Figure 20:
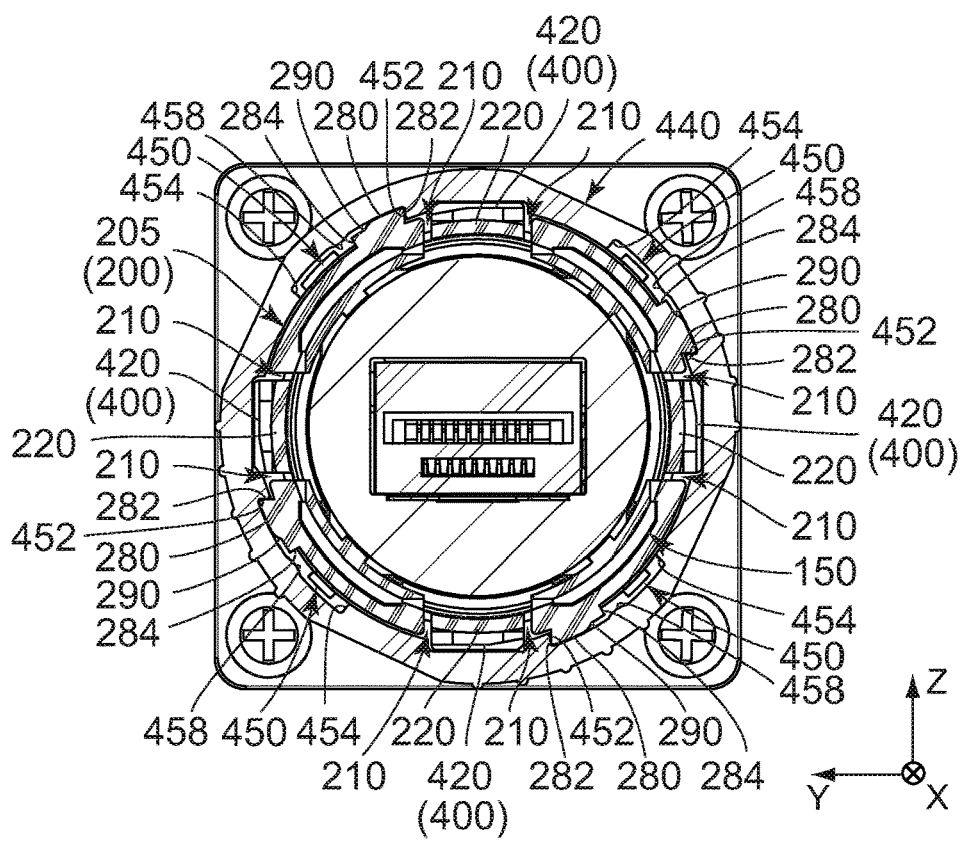
FIG. 20 is a cross-sectional view showing the connector device of FIG. 18, taken along line G-G.
Figure 26:
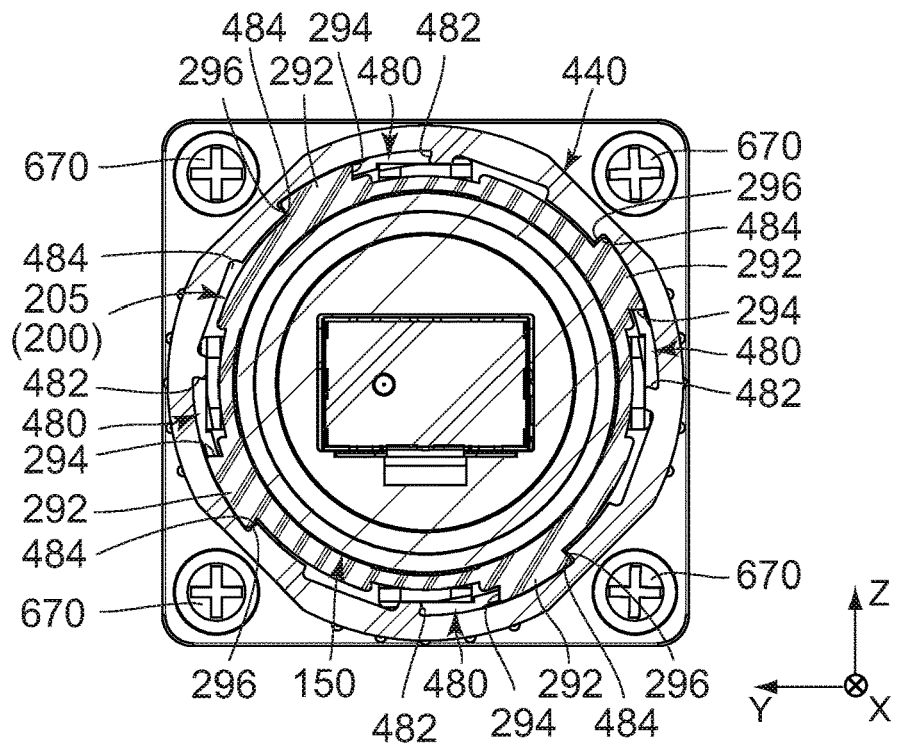
FIG. 26 is a cross-sectional view showing the connector device of FIG. 25, taken along line J-J.
Figure 27:
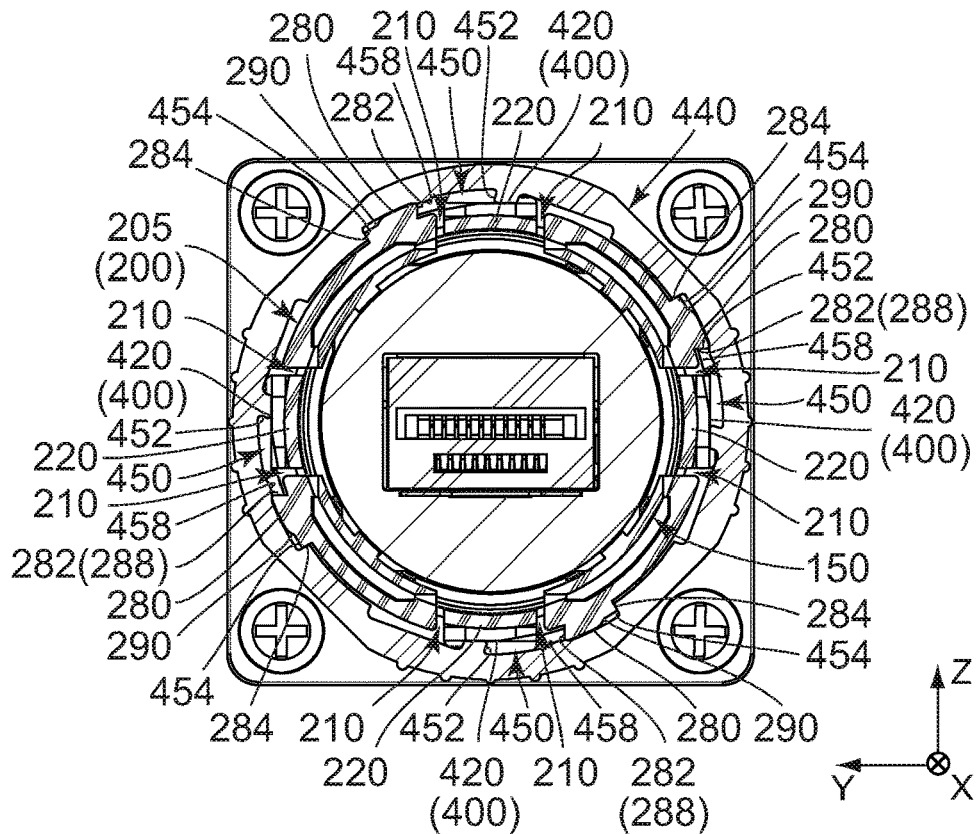
FIG. 27 is a cross-sectional view showing the connector device of FIG. 25, taken along line K-K.

As understood from FIGS. 13, 20 and 27, a size of the regulating-portion-accommodation portion 450 is larger than a size of the regulating portion 280 in the circumferential direction R about the axis AX. Moreover, as understood from FIGS. 12, 19 and 26, a size of the platform-shaped-supporting-portion-accommodation portion 480 is larger than a size of the platform-shaped-supporting portion 292. Accordingly, the regulating portion 280 can relatively move in the regulating-portion-accommodation portion 450 in the circumferential direction R about the axis AX, and the platform-shaped-supporting portion 292 can relatively move in the platform-shaped-supporting-portion-accommodation portion 480.

As shown in FIGS. 13 and 20, when the retaining member 440 is positioned in the second position, the first inner surface 452 of the regulating-portion-accommodation portion 450 is in contact with or faces the first regulating surface (the first regulating portion) 282 in the first turning direction. Then, the first regulating surface 282 functions as the first regulating portion 282 which regulates movement of the retaining member 440 so that the retaining member 440 is not moved beyond the second position in the first turning direction. At this time, the first inner surface 452 functions as the first regulated portion 452. In other words, the retaining member 440 is provided with the first regulated portions 452.

As shown in FIG. 27, when the retaining member 440 is positioned in the first position, the second inner surface 454 of the regulating-portion-accommodation portion 450 is in contact with or faces the second regulating surface (the second regulating portion) 284 in the second turning direction. Then, the second regulating surface 284 functions as the second regulating portion 284 which regulates movement of the retaining member 440 so that the retaining member 440 is not moved beyond the first position in the second turning direction. At this time, the second inner surface 454 functions as the second regulated portion 454. In other words, the retaining member 440 is provided with the second regulated portions 454.

As understood from FIGS. 6 to 11, the front surface 456 of the regulating-portion-accommodation portion 450 is in contact with or faces the front surface 286 of the regulating portion 280 corresponding thereto. Then, rearward movement of the front surface 456 of the regulating-portion-accommodation portion 450 in the front-rear direction is regulated by the front surface (the fourth regulating portion) 286 of the regulating portion 280. In other words, the front surface 456 of the regulating-portion-accommodation portion 450 is in contact with or faces the fourth regulating portion 286 in the front-rear direction, and thereby rearward movement of the retaining member 440 in the front-rear direction is regulated. In this way, the front surface 286 of the regulating portion 280 functions as the fourth regulating portion 286 which regulates the rearward movement of the retaining member 440 in the front-rear direction. At this time, the front surface 456 of the regulating-portion-accommodation portion 450 functions as a fourth regulated portion 456, wherein the movement of the fourth regulated portion 456 is regulated by the fourth regulating portion 286. In other words, the retaining member 440 is provided with the fourth regulated portion 456.

As shown in FIGS. 9 to 11, the retaining member 440 has protruding portions 458 each of which protrudes inward in the orthogonal direction in the regulating-portion-accommodation portion 450 corresponding thereto. Each of the protruding portions 458 temporarily regulates movement of the regulating portion 280 (see FIGS. 6 to 8) in the regulating-portion-accommodation portion 450. In detail, when the retaining member 440 is positioned in the first position, the protruding portion 458 is in contact with or faces the provisional regulating portion 288 in the first turning direction as shown in FIG. 27. In other words, when the retaining member 440 is positioned in the first position, the provisional regulating portion 288 is in contact with or faces the protruding portion 458 in the second turning direction. Accordingly, movement of the retaining member 440 in the first turning direction is temporarily regulated by the provisional regulating portion 288. At this time, the protruding portion 458 functions as a holding mechanism 458 which holds the retaining member 440 in the first position. Thus, the connector device 10 is provided with the holding mechanism 458 to hold the retaining member 440 at the first position.

As shown in FIGS. 9 to 11, the retaining member 440 is further provided with a plurality of grooves 460 each of which extends in the circumferential direction R about the axis AX. In the present embodiment, the retaining member 440 is formed with four grooves 460. The grooves 460 are formed in the front-end portion of the retaining member 440 and arranged at regular intervals in the circumferential direction R about the axis AX. Moreover, each of the grooves 460 opens forward in the front-rear direction and has a rear surface 462 directed forward in the front-rear direction. The rear surface 462 extends in the circumferential direction R about the axis AX and is directed forward in the front-rear direction.

As understood from FIGS. 6 to 11, the grooves 460 correspond to the protruding portions 310 of the locking member 200, respectively. Each of the grooves 460 accommodates the protruding portion 310 corresponding thereto. At this time, the rear surface 462 of the groove 460 is in contact with or faces the rear surface 312 of the protruding portion 310. The rear surface 462 of the groove 460 functions as a fifth regulated portion 462, wherein forward movement of the fifth regulated portion 462 is regulated by the protruding portion 310 in the front-rear direction. Moreover, the rear surface 312 of the protruding portion 310 functions as the fifth regulating portion 312. As just described, the retaining member 440 is provided with the fifth regulated portion 462. The fifth regulated portion 462 is in contact with or faces the fifth regulating portion 312 in the front-rear direction, and thereby forward movement of the retaining member 440 in the front-rear direction is regulated.

Mating Operation

A mating operation of the connector 100 and the mating connector 600 in the connector device 10 of the present embodiment will be described in detail in the following.

Firstly, as shown in FIG. 3, the connector 100 and the mating connector 600 are arranged to face each other in the front-rear direction so that a front end of the insertion portion 181 of the holding member 180 of the connector body 150 of the connector 100 faces the opening portion 682 of the connector accommodation portion 680 of the mating connector body 610 of the mating connector 600. After that, the connector 100 or the mating connector 600 is moved so that the connector 100 and the mating connector 600 becomes close to each other.

Thereupon, front ends of the projecting portions 240 of the locking member 200 of the connector 100 are brought into contact with rear ends of the bulge portions 645 of the mating projecting portion 640 of the mating shell 630 of the mating connector body 610 of the mating connector 600, respectively, and the supporting portions 220 of the locking member 200 of the connector 100 are resiliently deformed to move the projecting portions 240 outward in the orthogonal directions, respectively.

Next, the connector 100 or the mating connector 600 is further moved so that the connector 100 and the mating connector 600 become closer to each other. Thereupon, the projecting portions 240 of the connector 100 run onto the bulge portions 645 of the mating connector 600, respectively. In other words, the inner surfaces 242 of the projecting portions 240 of the connector 100 are brought into contact with the outer surfaces 647 of the bulge portions 645 of the mating connector 600, respectively.

Subsequently, the connector 100 or the mating connector 600 is moved so that the connector 100 and the mating connector 600 become further close to each other in the front-rear direction. Thereupon, each of the projecting portions 240 of the connector 100 is moved inward in the orthogonal direction, and the connector 100 and the mating connector 600 come into a first mated state (mated state) shown in FIGS. 15 to 18. At this time, in the first mated state in which the connector 100 and the mating connector 600 are mated with each other, the mating connector 600 is positioned forward of the connector 100 in the front-rear direction.

Figure 17:
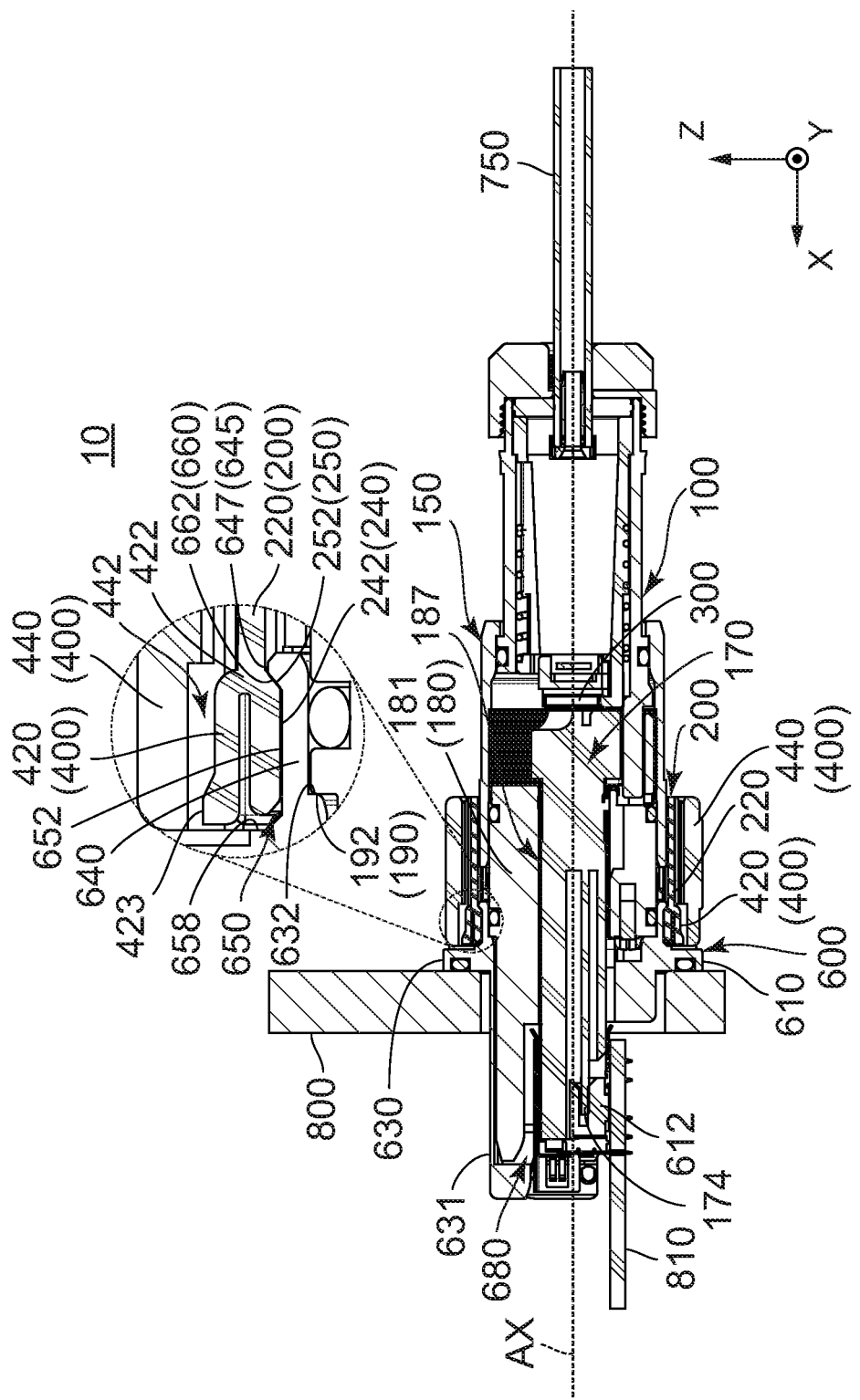
FIG. 17 is a cross-sectional view showing the connector device of FIG. 16, taken along line E-E. In the figure, a part of the connector and a part of the mating connector are shown on an enlarged scale.
Figure 18:
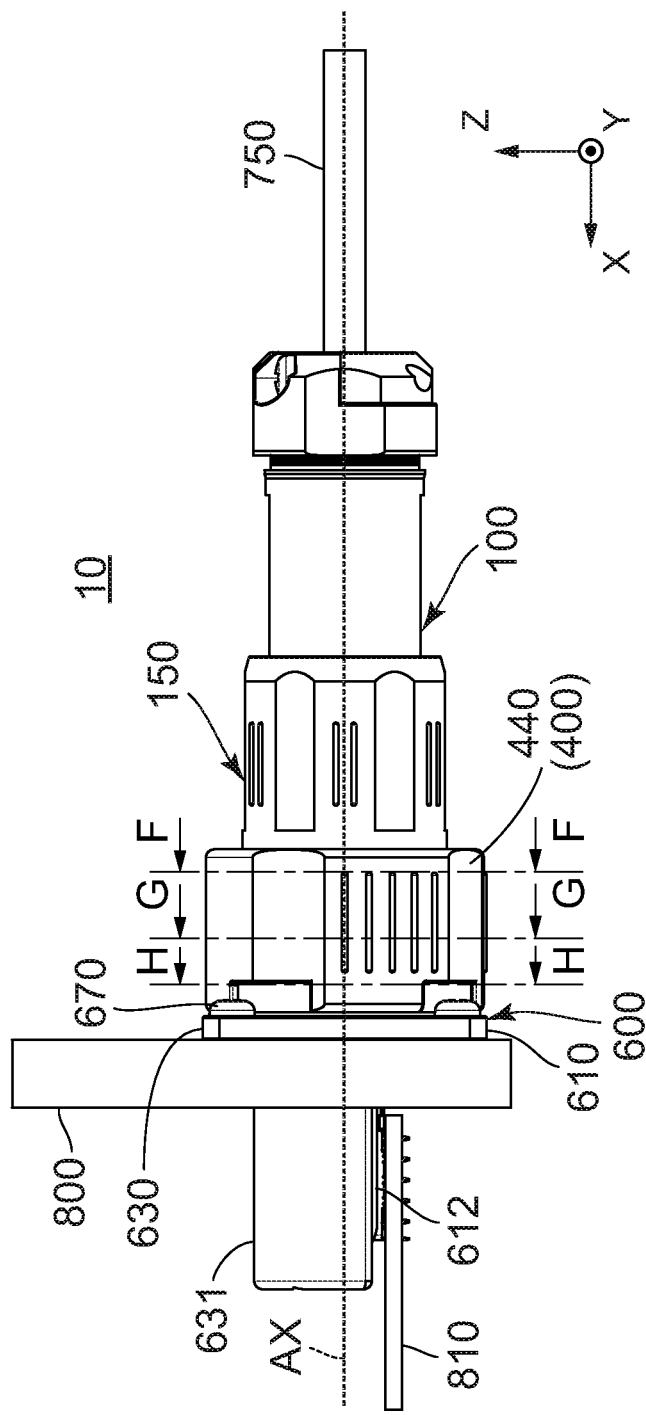
FIG. 18 is a side view showing the connector device of FIG. 15.

As shown in FIG. 17, in this first mated state, the insertion portion 181 of the connector 100 is accommodated in the connector accommodation portion 680 of the mating connector 600.

Moreover, in this first mated state, each of the depressed portions 650 of the mating projecting portion 640 of the mating shell 630 of the mating connector body 610 of the mating connector 600 receives the corresponding projecting portion 240 of the connector 100 at least in part, and the intersecting surface 662 of the mating locking portion 660 of the bulge portion 645 is located rearward of the projecting portion 240 as understood from FIG. 17. Here, although each of the projecting portions 240 of the connector 100 is in contact with the depressed portion 650 of the mating connector 600 via the intersecting surfaces 252 and 662, the inner surface 242 of the projecting portion 240 of the connector 100 is not in contact with the bottom surface 652 of the depressed portion 650 of the mating connector 600 in the orthogonal direction. And, a front end of the projecting portion 240 of the connector 100 is not in contact with the front surface 658 of the depressed portion 650 of the mating connector 600 in the front-rear direction. In other words, the projecting portion 240 of the connector 100 is in contact with the depressed portion 650 of the mating connector 600 only via the intersecting surfaces 252 and 662. In addition, each of the supporting portions 220 of the connector 100 is not in contact with the outer surface 647 of the bulge portion 645 of the mating connector 600 in the orthogonal direction.

Furthermore, in this first mated state, each of the supporting portions 220 of the connector 100 does not return to an original shape shown in FIG. 3 but remains resiliently deformed. Moreover, as shown in FIG. 17, the receiving portion 192 of the connector 100 and the abutment portion 632 of the mating shell 630 of the mating connector body 610 of the mating connector 600 are in contact with each other.

In more detail, in this first mated state, each of the mating locking portions 660 is located inward of the locking portion 250 in the orthogonal direction as shown in FIG. 17, and each of the supporting portions 220 presses the locking portion 250 against the mating locking portion 660. Moreover, in this first mated state, the locking portion 250 is pressed against the mating locking portion 660 via the intersecting surfaces 252 and 663 and applies a rearward force in the front-rear direction on the mating locking portion 660. In addition, in this first mated state, the abutment portion 632 of the mating connector 600 is located forward of the receiving portion 192 of the connector 100 in the front-rear direction. Here, as described above, the relative positions of the mating locking portion 660 and the abutment portion 632 are fixed in the front-rear direction. Accordingly, the rearward force applied on the mating locking portion 660 is transmitted to the abutment portion 632. However, the abutment portion 632 of the mating connector 600 is located forward of the receiving portion 192 of the connector 100 in the front-rear direction. Accordingly, the abutment portion 632 cannot be moved rearward beyond the receiving portion 192 owing to the receiving portion 192. In other words, in the first mated state, the abutment portion 632 of the mating connector 600 is brought into abutment with the receiving portion 192 of the connector 100 by the rearward force applied on the mating locking portion 660, and movement thereof beyond the receiving portion 192 is regulated by the receiving portion 192. Accordingly, the connector device 10 of the present embodiment is structured so that the connector 100 is not moved with respect to the mating connector 600 in the front-rear direction even if an external force in the front-rear direction is applied on the connector 100 or the mating connector 600 in the first mated state.

In particular, as described above, in the connector device 10 of the present embodiment, the locking portions 250 (see FIGS. 7 and 8) are arranged in the circumferential direction R about the axis AX at regular intervals, and all the intersecting surfaces 252 of the locking portions 250 are the parts of the conical surface having the center on the axis AX. Accordingly, when the connector 100 and the mating connector 600 are mated with each other, a resultant force of forces acting on the intersecting surfaces 252 of the locking portions 250 consists of only components of the front-rear direction because components of the forces acting on the intersecting surfaces 252 in directions perpendicular to the axis AX are canceled. Therefore, in this first mated state, no axis misalignment between the connector 100 and the mating connector 600 will occur.

In this first mated state, the front-rear-movement regulated portions 270 of the locking member 200 (see FIGS. 7 and 8) and the front-rear-movement regulating portions 160 of the connector body 150 (see FIG. 5) are in contact with each other. In more detail, in this first mated state, each of the locking portions 250 of the connector 100 (see FIG. 17) applies the rearward force on the mating locking portion 660 of the mating connector 600 (see FIG. 17) and receives a forward force from the mating locking portion 660 as a reaction force. Owing to the forward force received by the locking portions 250, the front-rear-movement regulated portion 270 is pressed against the front-rear-movement regulating portion 160, and relative movement between the locking member 200 and the connector body 150 is regulated.

In this first mated state, the retaining member 440 is positioned in the second position. At this time, as shown in FIG. 19, each of the platform-shaped-supporting portions 292 is located in the platform-shaped-supporting-portion-accommodation portion 480 and located near the inner side surface 482 in the circumferential direction R about the axis AX. Moreover, as shown in FIG. 20, each of the regulating portions 280 is located in the regulating-portion-accommodation portion 450 and between the protruding portion 458 and the first inner surface 452 in the circumferential direction R about the axis AX. In other words, the regulating portion 280 is located in the regulating-portion-accommodation portion 450 and located near the first inner surface 452 in the circumferential direction R. And, the first regulating surface 282 of the regulating portion 280 faces or is in contact with the first inner surface 452. With this structure, the movement of the retaining member 440 beyond the second position in the first turning direction is regulated. Moreover, as shown in FIG. 21, each of the additional resilience portions 420 is located in the additional-resilience-portion-accommodation portion 442. At this time, the additional resilience portion 420 is not in contact with the retaining member 440. Accordingly, the additional resilience portion 420 is not resiliently deformed nor presses the supporting portion 220. In other words, at this time, a maintained state caused by the maintaining mechanism 400 is cancelled.

In this first mated state, the terminal 500 of the connector 100 (see FIG. 3) is connected to the mating terminal 700 of the mating electric connector 612 of the mating connector body 610 of the mating connector 600 (see FIG. 3). In other words, in the first mated state, the connector device 10 has an electrical contact between the terminal 500 of the connector 100 and the mating terminal 700 of the mating connector 600.

Upon moving the retaining member 440 in the second turning direction with respect to the locking member 200 from the first mated state shown in FIG. 17, each of the protruding portions 458 of the retaining member 440 (see FIG. 20) is guided by the guide portion 290 of the regulating portion 280 of the locking member 200 (see FIG. 20) and moved on the regulating portion 280 of the locking member 200 (see FIG. 20). Simultaneously, each of the inclined surfaces 444 of the retaining member 440 (see FIG. 21) is brought into abutment with the chamfer 424 of the additional resilience portion 420 of the locking member 200 (see FIG. 21). The chamfer 424 guides movement of the retaining member 44 in the second turning direction and prevents the supporting portion 220 from twisting.

After that, upon further moving the retaining member 440 with respect to the locking member 200 in the second turning direction, the connector 100 and the mating connector 600 come into a second mated state (a mated state) shown in FIGS. 22 to 25. At this time, the retaining member 440 is positioned in the first position. Moreover, in the second mated state that the connector 100 and the mating connector 600 are mated with each other, the mating connector 600 is positioned forward of the connector 100 in the front-rear direction.

Figure 28:
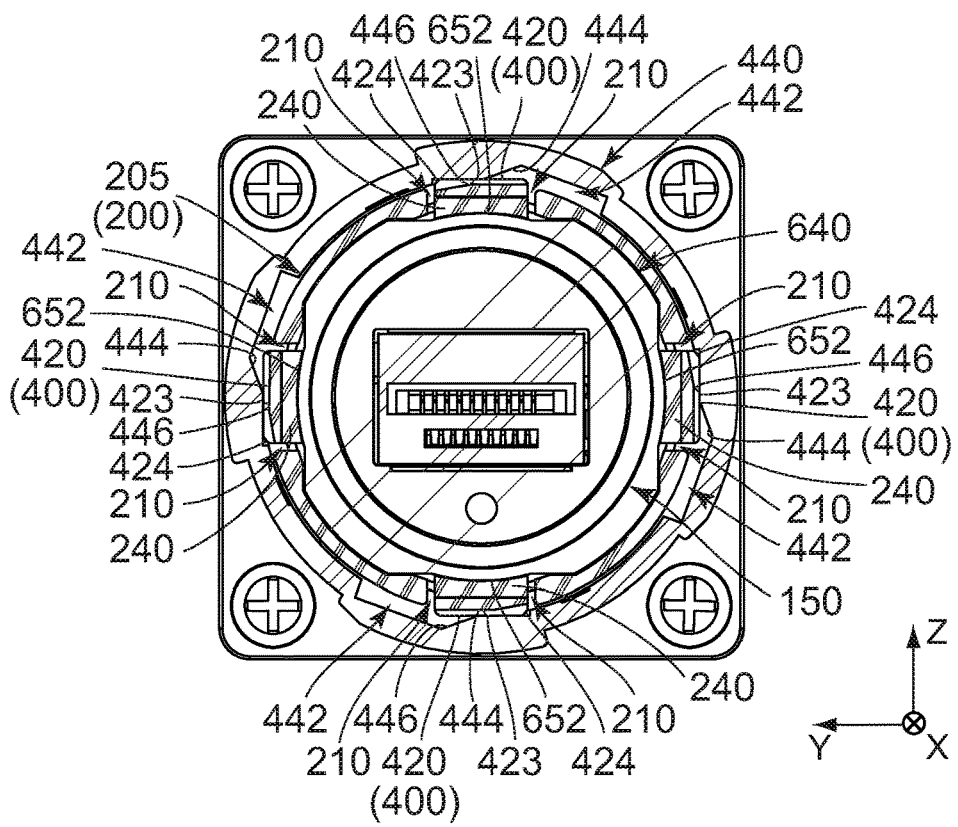
FIG. 28 is a cross-sectional view showing the connector device of FIG. 25, taken along line L-L.

In the second mated state, each of the platform-shaped-supporting portions 292 is located near the inner side surface 484 of the platform-shaped-supporting-portion-accommodation portion 480 in the circumferential direction R about the axis AX as shown in FIG. 26. Moreover, each of the regulating portions 280 is located between the protruding portion 458 and the second inner surface 454 of the regulating-portion-accommodation portion 450 in the circumferential direction R about the axis AX as shown in FIG. 27. The second regulating surface 284 of the regulating portion 280 faces or is in contact with the second inner surface 454. Accordingly, the movement of the retaining member 440 beyond the first position in the second turning direction is regulated. On the other hand, each of the protruding portions 458 is in contact with the provisional regulating portion 288 in the first turning direction, and the provisional regulating portion 288 provisionally regulates the movement of the retaining member 440 in the first turning direction. Moreover, each of the inclined surfaces 444 of the retaining member 440 rides over the chamfer 424 of the additional resilience portion 420 and is located outward of the pressed portion 423 in the radial direction as shown in FIG. 28. Furthermore, each of the pressing portions 446 of the retaining member 440 is positioned outward of the pressed portion 423 in the radial direction. The pressing portion 446 is in contact with the pressed portion 423 and presses the pressed portion 423 inward in the orthogonal direction. Accordingly, a state that the additional resilience portion 420 is resiliently deformed inward in the orthogonal direction is maintained. The additional resilience portion 420 lies between the retaining member 440 and the supporting portion 220 (see FIGS. 24 and 27) and applies a force directed inward on the supporting portions 220. In this way, the additional resilience portion 420 presses the supporting portion 220 to form a maintain state that pressing of the locking portion 250 to the mating locking portion 660 is maintained. Thus, according to the present embodiment, a maintain means which is distinct and separated from the connector 100 is unnecessary.

Figure 24:
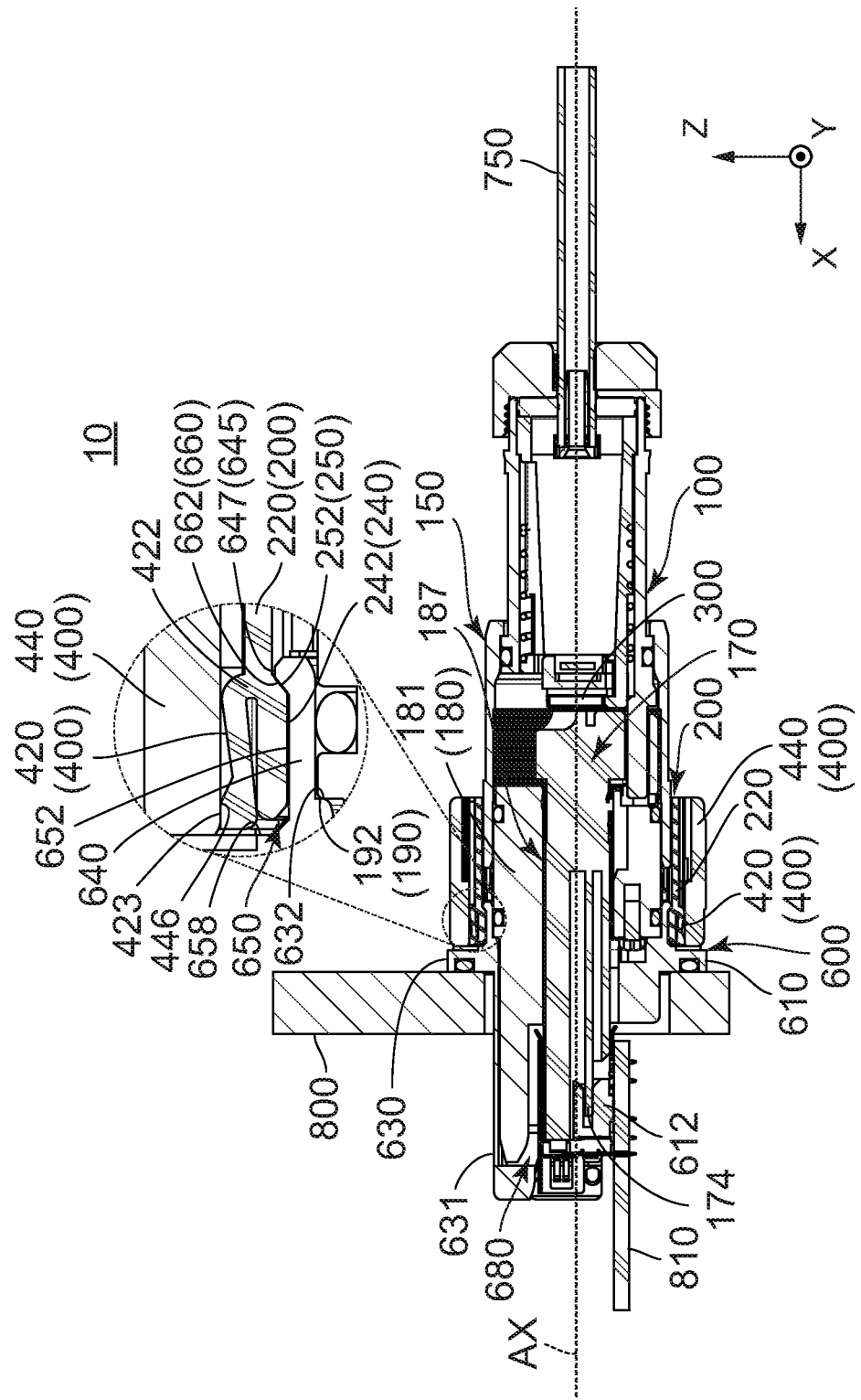
FIG. 24 is a cross-sectional view showing the connector device of FIG. 23, taken along line I-I. In the figure, a part of the connector and a part of the mating connector are shown on an enlarged scale.
Figure 25:
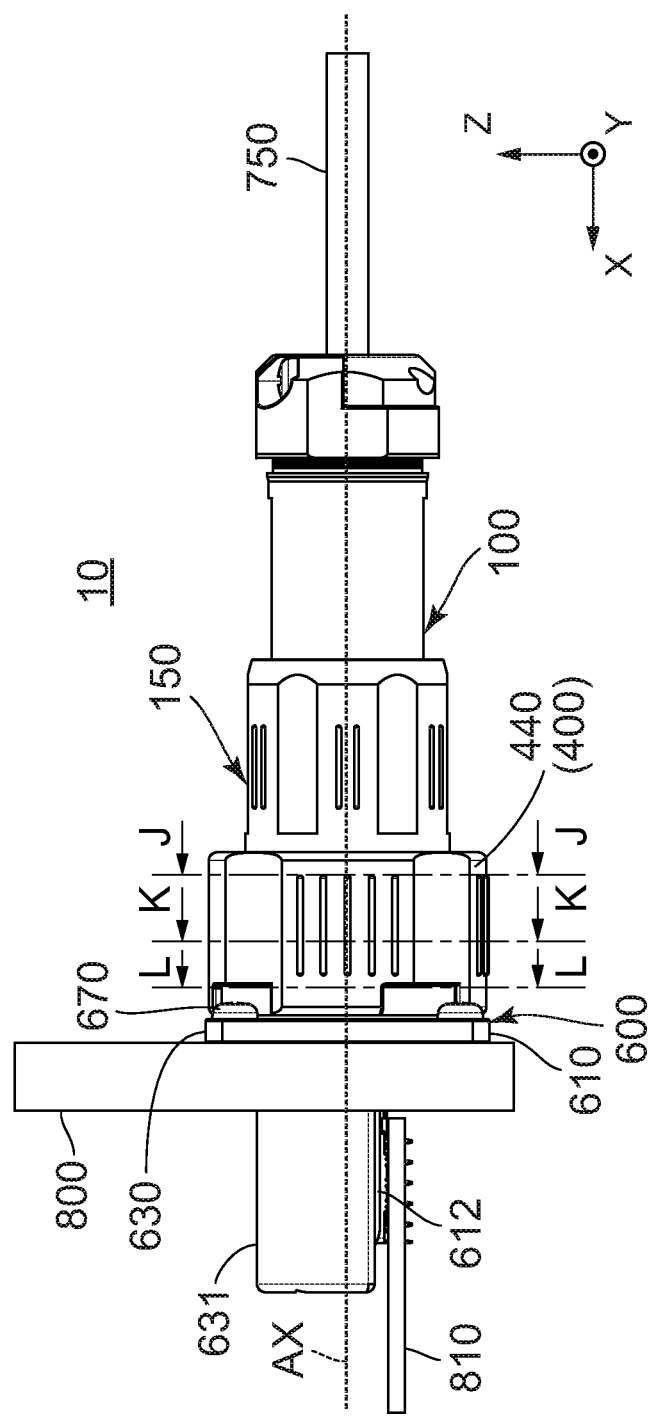
FIG. 25 is a side view showing the connector device of FIG. 22.

In this second mated state, as understood from FIG. 24, each of the depressed portions 650 of the mating projecting portion 640 of the mating shell 630 of the mating connector body 610 of the mating connector 600 receives the corresponding projecting portion 240 of the connector 100 at least in part, and the intersecting surface 662 of the mating locking portion 660 of the bulge portion 645 is located rearward of the projecting portion 240. Here, the projecting portion 240 of the connector 100 is in contact with the depressed portion 650 of the mating connector 600 via the intersecting surfaces 252 and 662. However, the inner surface 242 of the projecting portion 240 of the connector 100 is not in contact with the bottom surface 652 of the depressed portion 650 of the mating connector 600 in the orthogonal direction. The front end of the projecting portion 240 of the connector 100 is not in contact with the front surface 658 of the depressed portion 650 of the mating connector 600 in the front-rear direction. In other words, the projecting portion 240 of the connector 100 is in contact with the depressed portion 650 of the mating connector 600 only via the intersecting surfaces 252 and 662. In addition, the supporting portion 220 of the connector 100 is not in contact with the outer surface 647 of the bulge portion 645 of the mating connector 600 in the orthogonal direction.

Moreover, in this second mated state, each of the supporting portions 220 of the connector 100 does not return to the original shape shown in FIG. 3 but remains resiliently deformed. Moreover, as shown in FIG. 24, the receiving portion 192 of the connector 100 and the abutment portion 632 of the mating shell 630 of the mating connector body 610 of the mating connector 600 are in contact with each other.

In more detail, in this second mated state, as shown in FIG. 24, each of the mating locking portions 660 is located inward of the locking portion 250 in the orthogonal direction, and each of the supporting portions 220 presses the locking portion 250 against the mating locking portion 660. Moreover, in this second mated state, the locking portion 250 is pressed against the mating locking portion 660 via the intersecting surfaces 252 and 662 owing to resilience of the supporting portion 220 and applies the rearward force on the mating locking portion 660 in the front-rear direction. In addition, in this second mated state, the abutment portion 632 of the mating connector 600 is located forward of the receiving portion 192 of the connector 100 in the front-rear direction. Here, as described above, the relative positions of the mating locking portion 660 and the abutment portion 632 in the front-rear direction are fixed. Accordingly, the rearward force applied on the mating locking portion 660 is transmitted to the abutment portion 632. However, the abutment portion 632 of the mating connector 600 is located forward of the receiving portion 192 of the connector 100 in the front-rear direction. Accordingly, the abutment portion 632 cannot be moved beyond the receiving portion 192 owing to the receiving portion 192. In other words, in this second mated state, the abutment portion 632 of the mating connector 600 is brought into abutment with the receiving portion 192 of the connector 100 by the rearward force applied on the mating locking portion 660, and rearward movement thereof beyond the receiving portion 192 is regulated by the receiving portion 192. Accordingly, the connector device 10 according to the present embodiment is structured so that the connector 100 is not moved with respect to the mating connector 600 even if an external force is applied on the connector 100 or the mating connector 600 in the front-rear direction in the second mated state.

In particular, as described above, in the connector device 10 of the present embodiment, the locking portions 250 (see FIGS. 7 and 8) are arranged at regular intervals in the circumferential direction R about the axis AX, and all the intersecting surfaces 252 of the locking portions 250 are the parts of the conical surface having the center on the axis AX. Accordingly, when the connector 100 and the mating connector 600 are mated with each other, the resultant force of the forces acting on the intersecting surfaces 252 of the locking portions 250 consists of the only components of the front-rear direction because the components of the forces acting on the intersecting surfaces 252 in directions perpendicular to the axis AX are canceled. Therefore, in this second mated state, no axis misalignment between the connector 100 and the mating connector 600 will occur.

In this second mated state, each of the front-rear-movement regulated portions 270 of the locking member 200 (see FIGS. 7 and 8) and the front-rear-movement regulating portion 160 of the connector body 150 (see FIG. 5) are in contact with each other. In more detail, in this second mated state, when the locking portion 250 of the connector 100 (see FIG. 24) applies the rearward force on the mating locking portion 660 of the mating connector 600, the locking portion 250 receives the forward force as the reaction force from the mating locking portion 660. The front-rear-movement regulated portion 270 is pressed against the front-rear-movement-regulating portion 160 by the forward force received by the locking portion 250, and the relative movement between the locking member 200 and the connector body 150 is regulated.

In this second mated state, as shown in FIG. 28, each of the pressing portions 446 of the retaining member 440 is located outward of the pressed portion 423 in the orthogonal direction and presses the pressed portion 423 to maintain the state that the supporting portion 220 (see FIG. 24) presses the locking portion 250 (see FIG. 24) against the mating locking portion 660 (FIG. 24). In this way, the retaining member 440 and the additional resilience portions 420 form the maintaining mechanism 400. Moreover, in this second mated state, as shown in FIG. 24, each of the additional resilience portions 420 is located between the supporting portion 220 and the retaining member 440 and applies an inward force on the supporting portion 220 in the orthogonal direction.

In more detail, in this second mated state, as shown in FIG. 24, the pressing portion 446 of the retaining member 440 is in contact with the pressed portion 423 of the additional resilience portion 420 of the locking member 200 and presses the additional resilience portion 420 of the locking member 200 from outside in the orthogonal direction.

In this second mated state, the terminal 500 of the connector 100 (FIG. 3) is connected to the mating terminal 700 of the mating electric connector 612 of the mating connector body 610 of the mating connector 600 (FIG. 3). In other words, in the second mated state, the connector device 10 has an electrical contact between the terminal 500 of the connector 100 and the mating terminal 700 of the mating connector 600.

Mating Release Operation

In a case to release mating of the connector 100 and the mating connector 600 in the connector device 10, just carry out a reverse operation of the mating operation of the connector 100 and the mating connector 600.

Second Embodiment

Figure 29:
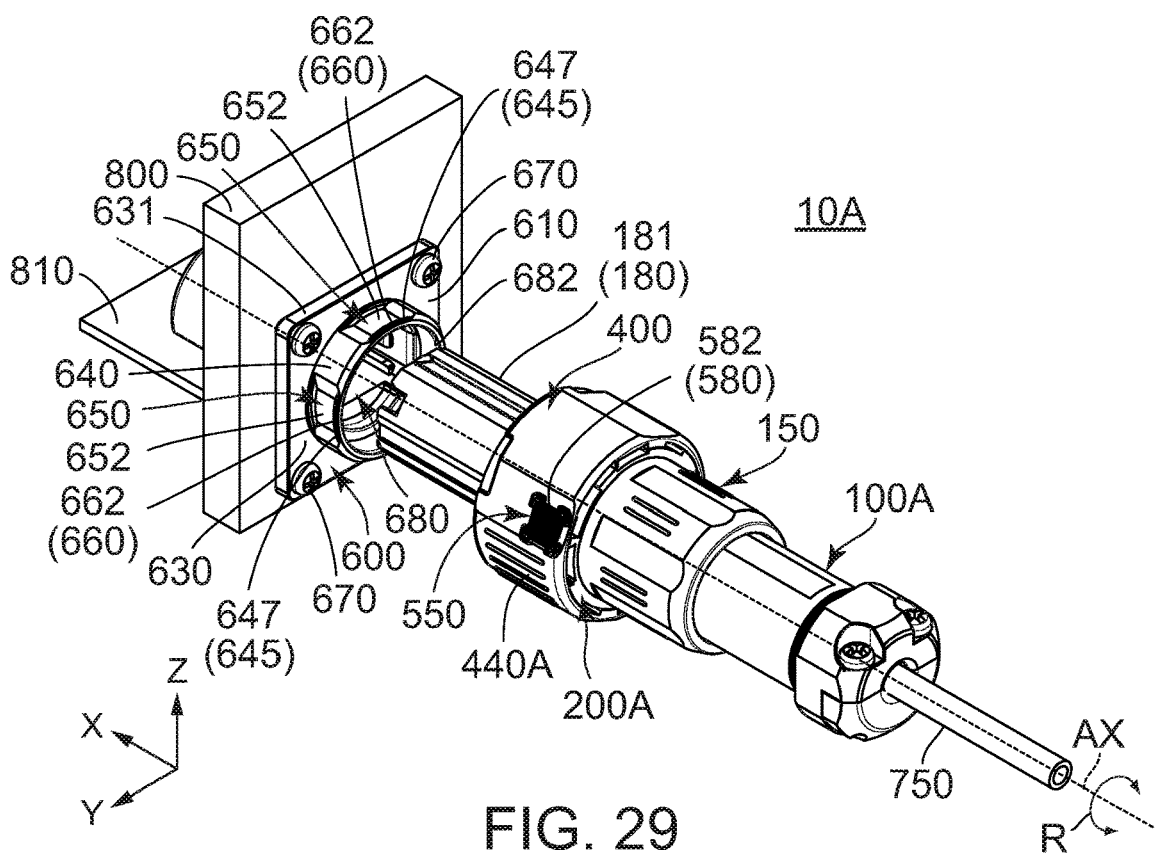
FIG. 29 is a perspective view showing a connector device according to a second embodiment of the present invention. In the figure, a connector and a mating connector are not mated with each other.

Referring to FIG. 29, a connector device 10A according to a second embodiment of the present invention is provided with a mating connector 600 and a connector 100A. Difference between the connector device 10A and the connector device 10 according to the first embodiment is in a point that the connector 100A is provided with a maintained-state-holding mechanism 550. In other points, the connector device 10A and the connector device 10 are in common with each other. Accordingly, the description of them will be omitted.

Figure 30:
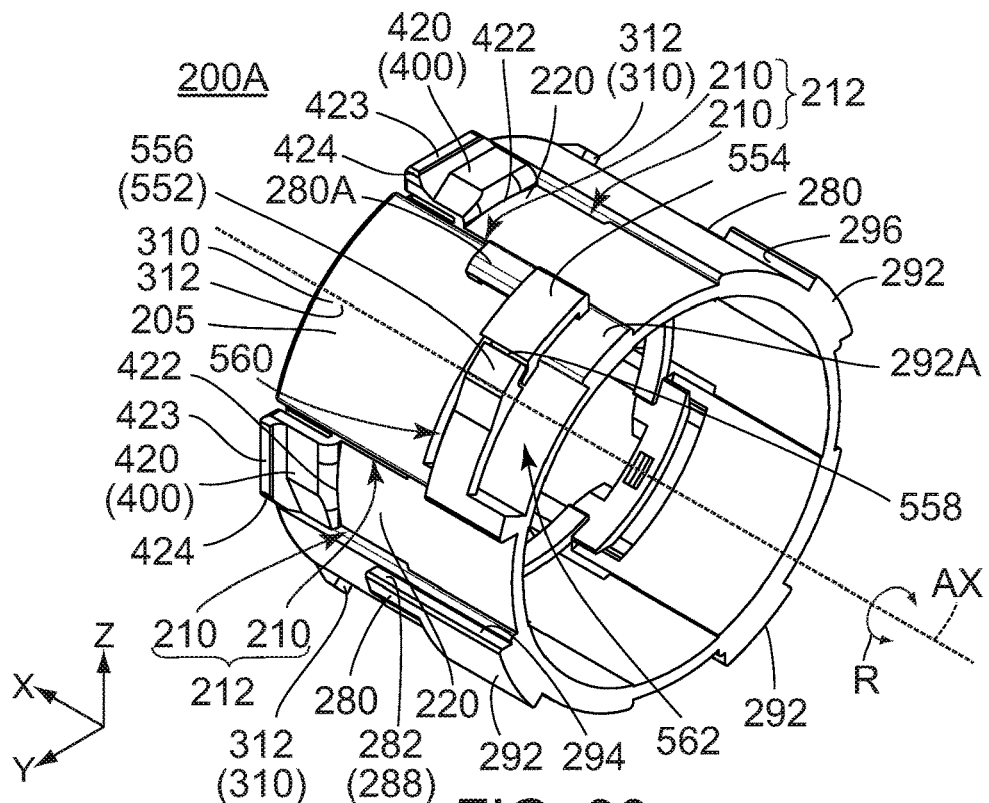
FIG. 30 is a perspective view showing a locking member included in the connector of the connector device of FIG. 29.
Figure 31:
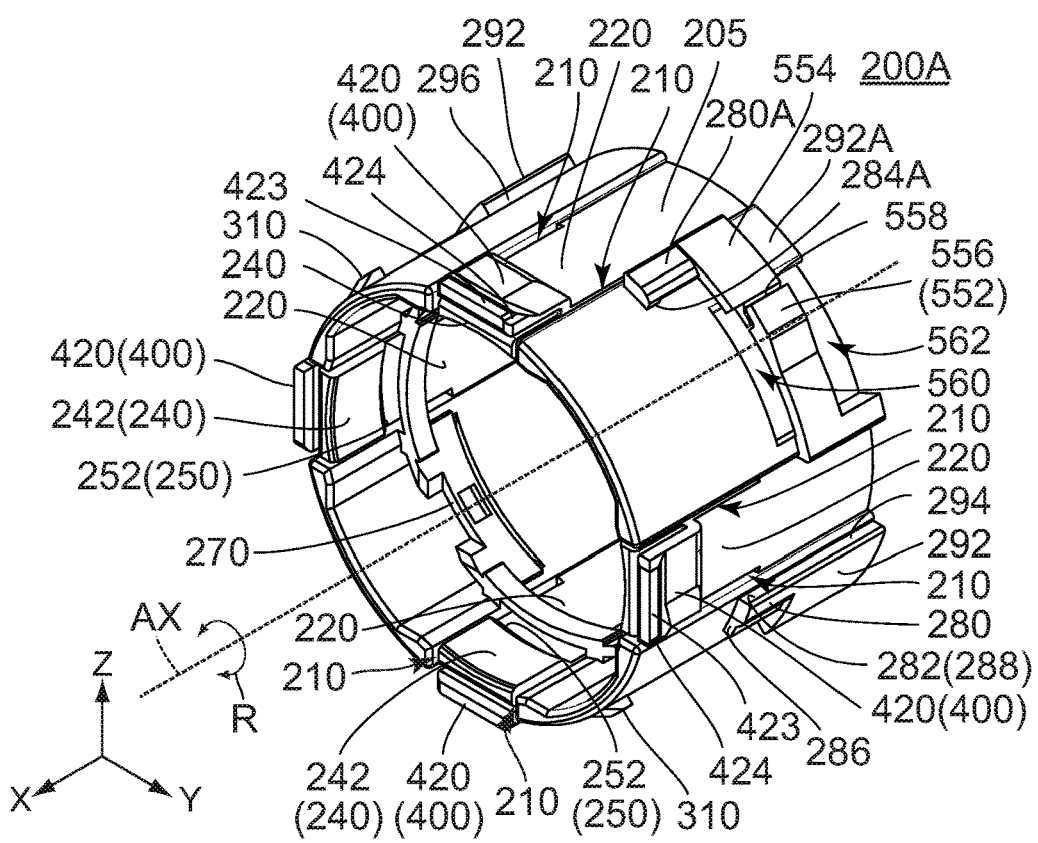
FIG. 31 is another perspective view showing the locking member of FIG. 30.

Referring to FIGS. 30 and 31, a locking member 200A of the connector device 10A is provided with an additional supporting portion 552 and a subsidiary resilient piece 554. However, the present invention is not limited thereto. The locking member 200A may not have the subsidiary resilient piece 554.

As shown in FIGS. 30 and 31, the additional supporting portion 552 and the subsidiary resilient piece 554 are located between adjacent two of the supporting portions 220 in the circumferential direction R about the axis AX. Moreover, the additional supporting portion 552 and the subsidiary resilient piece 554 are located rearward of a regulating portion 280A in the front-rear direction. Additionally, the regulating portion 280A is smaller than other regulating portions 280 in size in the circumferential direction R about the axis AX.

As understood from FIGS. 30 and 31, the additional supporting portion 552 is a resilient piece having a cantilever-shape extending in the second turning direction. Moreover, the subsidiary resilient piece 554 is a resilient piece having a cantilever-shape extending in the first turning direction. Each of the additional supporting portion 552 and the subsidiary resilient piece 554 has resilience, and a tip portion thereof is movable at least in the orthogonal direction. The tip portion of the additional supporting portion 552 and the tip portion of the subsidiary resilient piece 554 overlap with each other when viewed along the orthogonal direction. In detail, in the orthogonal direction, the tip of the additional supporting portion 552 is located slightly apart from and outward of the tip portion of the subsidiary resilient piece 554. In other words, the subsidiary resilient piece 554 is located inward of the additional supporting portion 552 at least in part in the orthogonal direction. However, the present invention is not limited thereto. The additional supporting portion 552 may be formed to have a both ends supported beam shape. In that case, the subsidiary resilient piece 554 is unnecessary. However, when operationality, a displacement amount and durability of the additional supporting portion 552 are considered, it is desirable to combine the additional supporting portion 552 having the cantilever-shape and the subsidiary resilient piece 554.

As shown in FIGS. 30 and 31, the tip portion of the additional supporting portion 552 is provided with an operated portion 556. In the present embodiment, the operated portion 556 is a surface of the tip portion of the additional supporting portion 552, wherein the surface is a plane surface including a part perpendicular to the orthogonal direction. The operated portion 556 is directed outward in the orthogonal direction. When the operated portion 556 is pressed inward in the orthogonal direction, the additional supporting portion 552 is resiliently deformed. Then, the tip portion of the additional supporting portion 552 is moved inward in the orthogonal direction. When movement of the tip portion of the additional supporting portion 552 becomes large, the tip portion of the additional supporting portion 552 is brought into abutment with the tip portion of the subsidiary resilient piece 554. Accordingly, the additional supporting portion 552 is prevented from being excessively deformed.

As understood from FIGS. 30 and 31, the additional supporting portion 552 has an extremity surface 558 directed in the second turning direction in the circumferential direction R about the axis AX. The extremity surface 558 functions as a third regulating portion 558 as described later. In other words, the locking member 200A is provided with the third regulating portion 558. The third regulating portion 558 is supported by the additional supporting portion 552 to be movable at least in the orthogonal direction. However, the present invention is not limited thereto. The third regulating portion 558 may be a protruding portion provided to the additional supporting portion 552.

As shown in FIGS. 30 and 31, the locking member 200A is provided with leg accommodation portions 560 and 562. Each of the leg accommodation portions 560 and 562 is adjacent to the additional supporting portion 552 in the front-rear direction. The additional supporting portion 552 is located between the leg accommodation portions 560 and 562 in the front-rear direction. The leg accommodation portions 560 and 562 accommodate two leg portions 584 and 586 (see FIG. 37) of an operation member 580 (see FIG. 29), respectively, and allow movement of the leg portions 584 and 586 in the circumferential direction R about the axis AX. In the present embodiment, the leg accommodation portions 560 and 562 communicate with each other in the front-rear direction. In detail, each of the leg accommodation portions 560 and 562 communicates with a space located inward of the additional supporting portion 552 and the subsidiary resilient piece 554 in the orthogonal direction. However, the leg accommodation portions 560 and 562 may not communicate with each other. However, when the leg accommodation portions 560 and 562 communicate with each other, manufacture of the locking member 200A by molding can be easily carried out.

Figure 32:
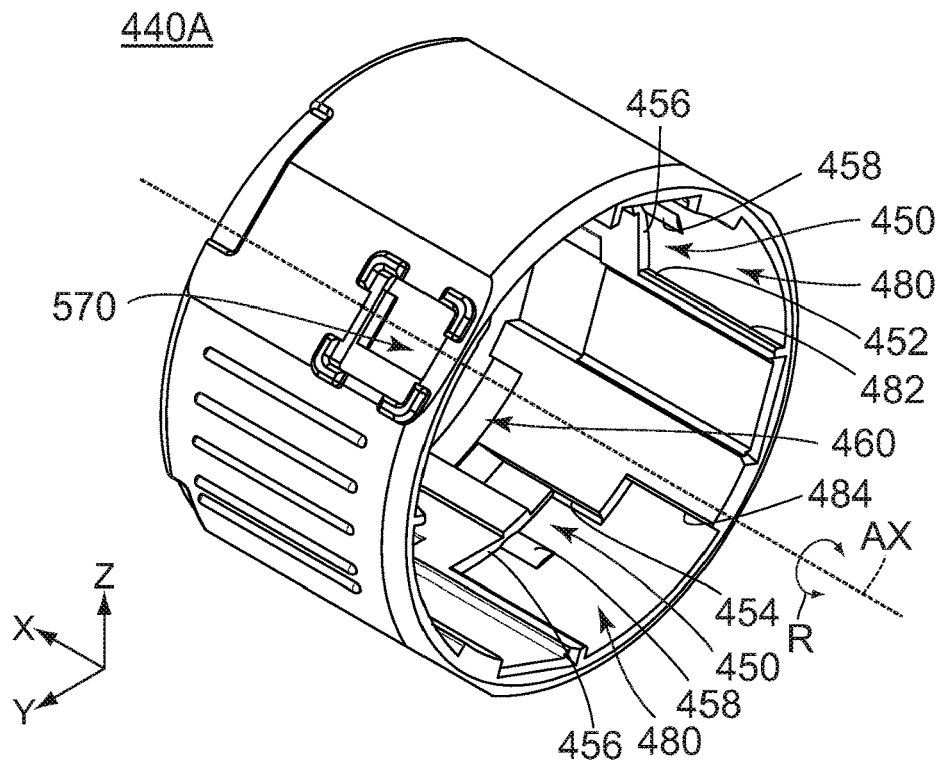
FIG. 32 is a perspective view showing a retaining member included in the connector of the connector device of FIG. 29.
Figure 33:
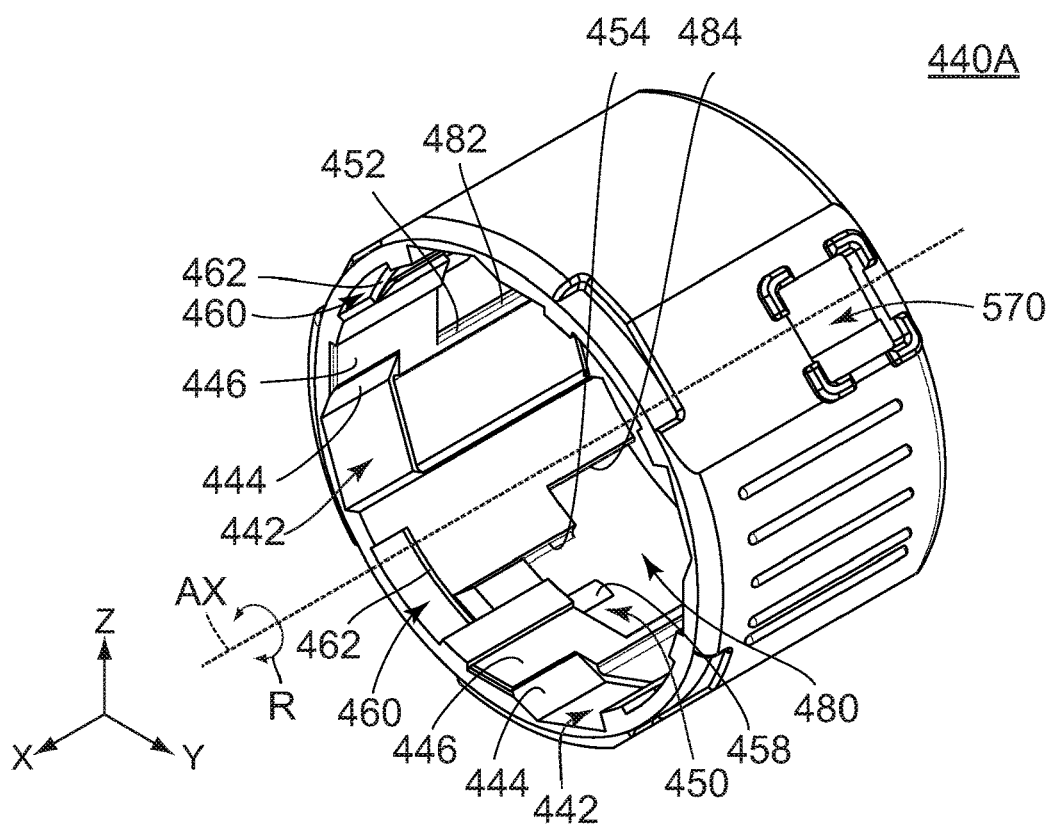
FIG. 33 is another perspective view showing the retaining member of FIG. 32.
Figure 34:
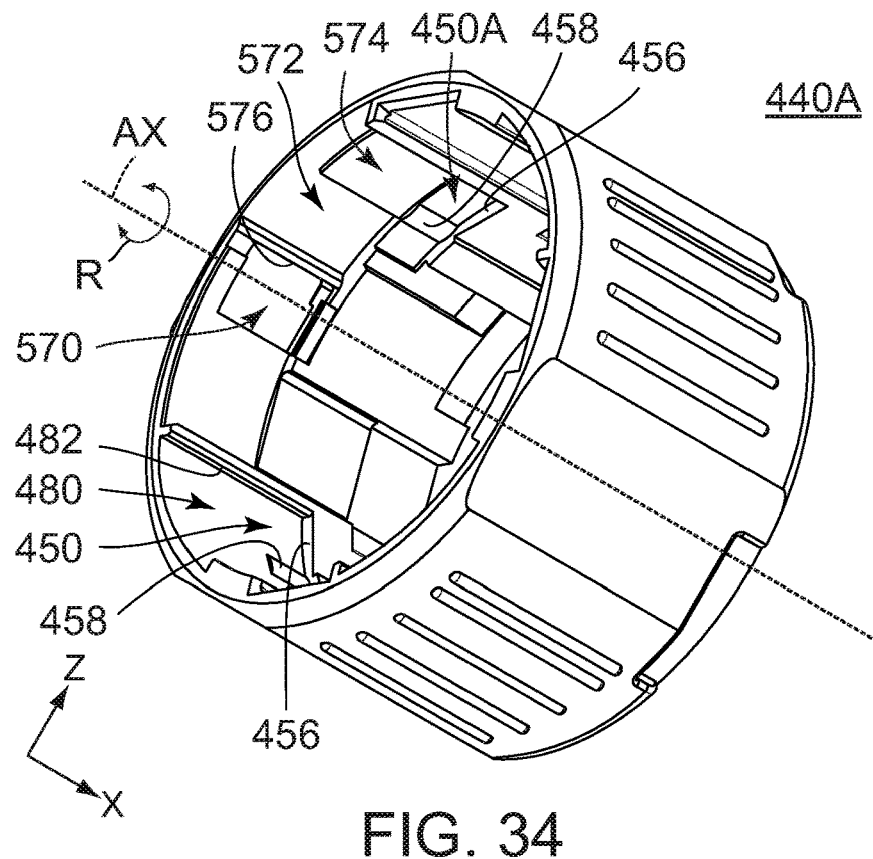
FIG. 34 is yet another perspective view showing the retaining member of FIG. 32.

Referring to FIGS. 32 to 34, a retaining member 440A is provided with a window portion 570. The window portion 570 has a rectangular shape when viewed along the orthogonal direction. The window portion 570 is provided in a place corresponding to the additional supporting portion 552 of the locking member 200A (see FIGS. 30 and 31). In detail, the window portion 570 is provided to a rear end portion of the retaining member 440A in the front-rear direction. To the window portion 570, the operation member 580 (see FIG. 29) is attached. In other words, the connector 100A is provided with the operation member 580.

As shown in FIG. 34, the retaining member 440A is provided with an additional-supporting-portion-accommodation portion 572 and a subsidiary-resilient-piece-accommodation portion 574. The additional-supporting-portion-accommodation portion 572 is adjacent to the window portion 570 in the circumferential direction R about the axis AX. Moreover, the subsidiary-resilient-piece-accommodation portion 574 is adjacent to the additional-supporting-portion-accommodation portion 572 in the circumferential direction R about the axis AX. The additional-supporting-portion-accommodation portion 572 is located between the window portion 570 and the additional-supporting-portion-accommodation portion 572 in the circumferential direction R about the axis AX.

As shown in FIG. 34, one of edge portions forming the window portion 570 is formed to be thick. In more detail, an edge portion 576, which is directed in the first turning direction, among the edge portions of the window portion 570 is formed to be thick. The edge portion 576 is located between the window portion 570 and the additional-supporting-portion-accommodation portion 572. The edge portion 576 functions as a third regulated portion 576 as described later. In other words, the retaining member 440A is provided with the third regulated portion 576.

Figure 37:
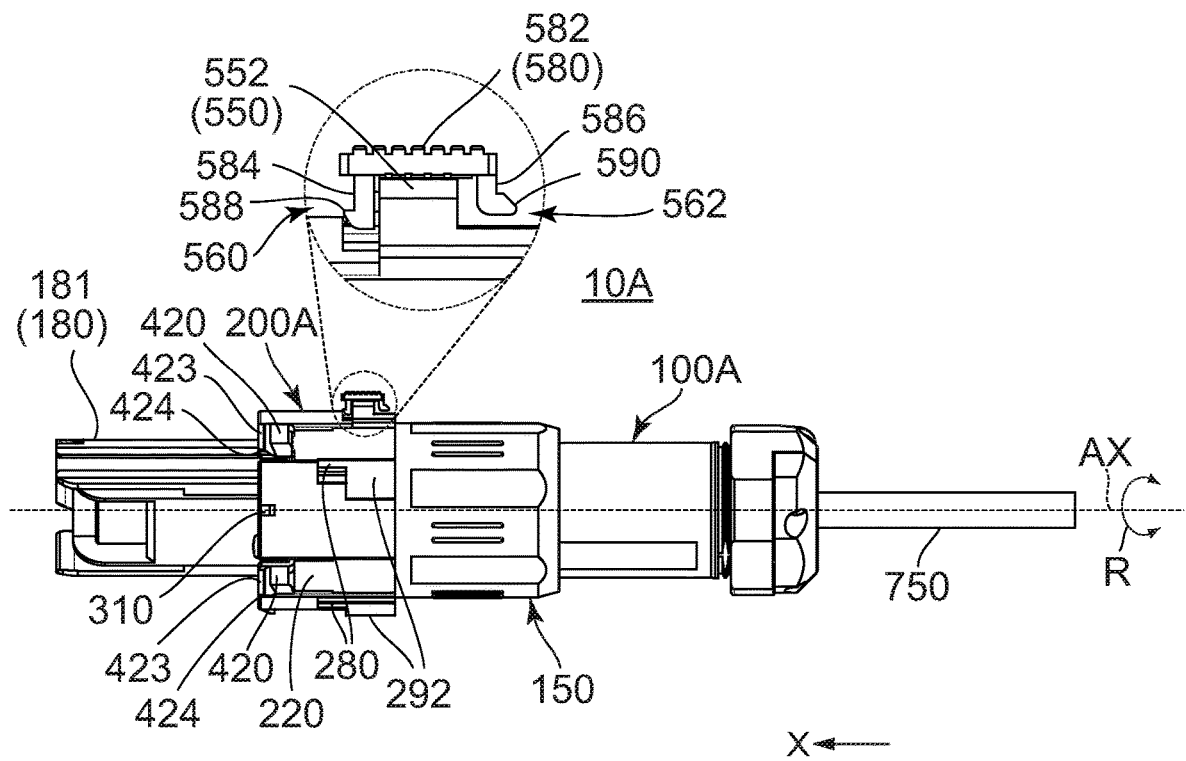
FIG. 37 is a side view showing the connector of FIG. 35. In the figure, an operation member included in the connector is shown on an enlarged scale.

As shown in FIG. 37, the operation member 580 has an operation portion 582 and two leg portions 584 and 586. The leg portions 584 and 586 are located apart from each other in the front-rear direction. Moreover, the leg portions 584 and 586 are provided with hook portions 588 and 590, respectively, which protrude outward in the front-rear direction. The operation member 580 is attached to the window portion 570 of the retaining member 440A (see FIG. 32) so as to be movable in the orthogonal direction. Each of the leg portions 584 and 586 has a length enough to be moved in the orthogonal direction in a state that the operation member 580 is attached to the window portion 570. Moreover, the hook portions 588 and 590 prevent the operation member 580 from being detached from the window portion 570.

Figure 35:
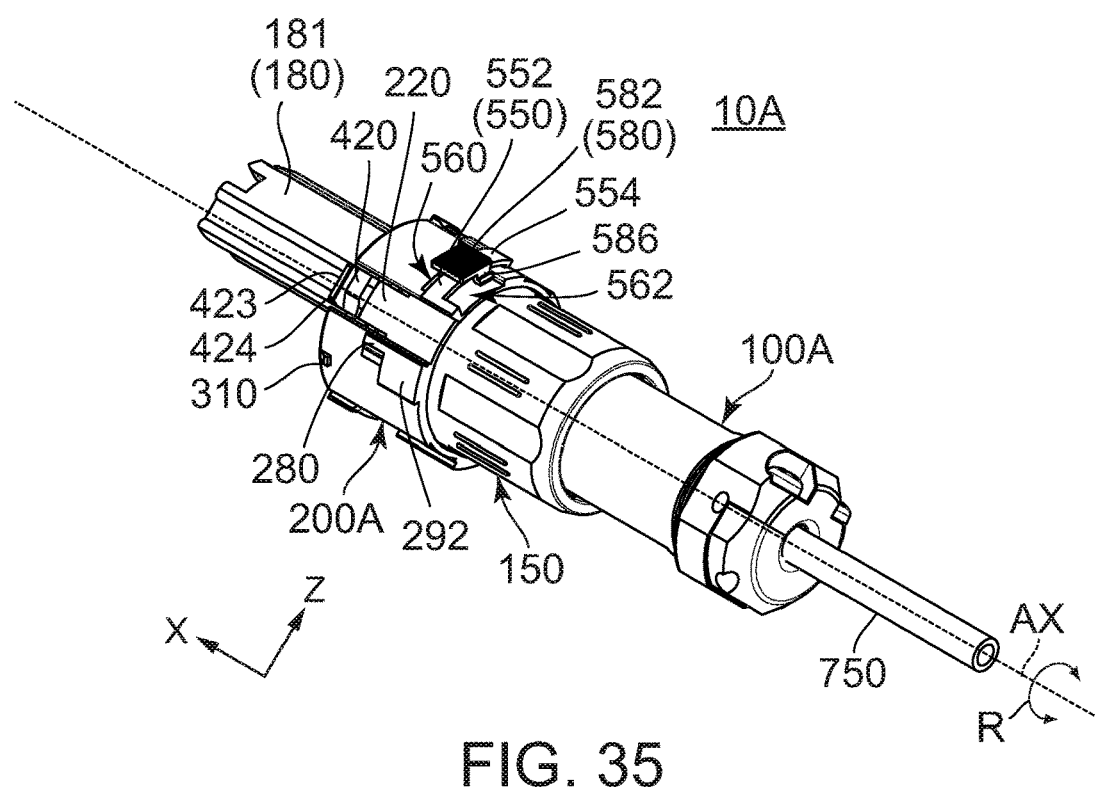
FIG. 35 is a perspective view showing the connector of the connector device of FIG. 29. In the figure, the retaining member included in the connector is omitted.
Figure 36:
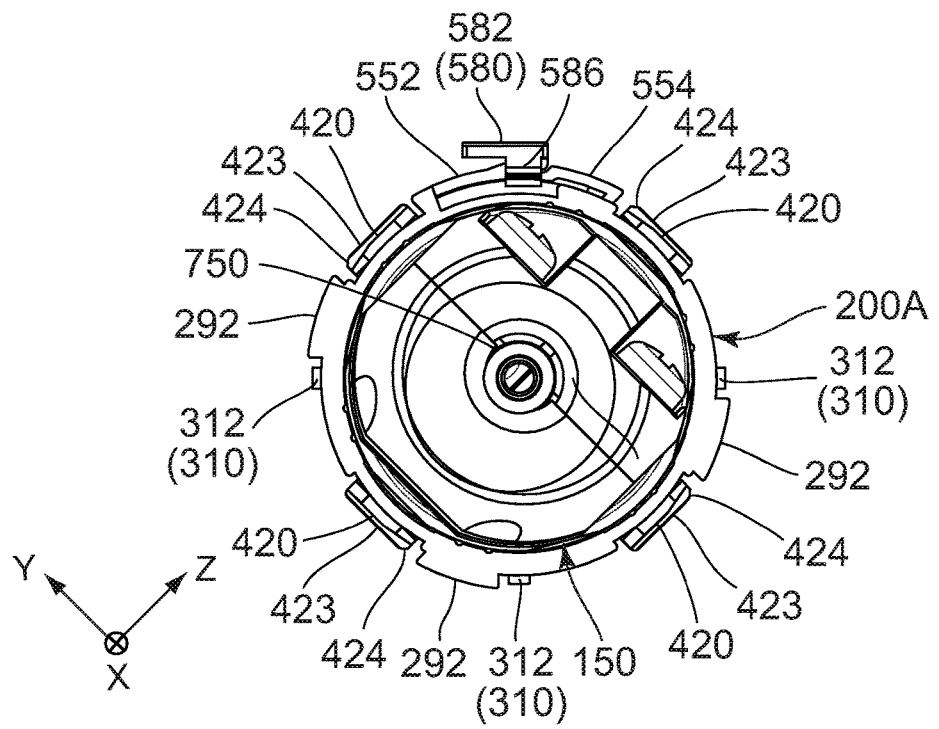
FIG. 36 is a rear view showing the connector of FIG. 35.

As shown in FIGS. 35 to 37, the operation member 580 is disposed to extend over the additional supporting portion 552 in the front-rear direction. In other words, the additional supporting portion 552 is located between the leg portions 584 and 586 in the front-rear direction. The operation member 580 is located outward of the additional supporting portion 552 in the orthogonal direction at least in part. Upon moving the retaining member 440A (see FIG. 29) in the circumferential direction R about the axis AX, the operation portion 582 of the operation member 580 is moved outside the additional supporting portion 552 in the orthogonal direction. Moreover, the leg portions 584 and 586 of the operation member 580 are moved in the leg accommodation portions 560 and 562, respectively. The leg accommodation portions 560 and 562 allow movement of the retaining member 440A between the first position and the second position by allowing movement of the leg portions 584 and 586.

Figure 38:
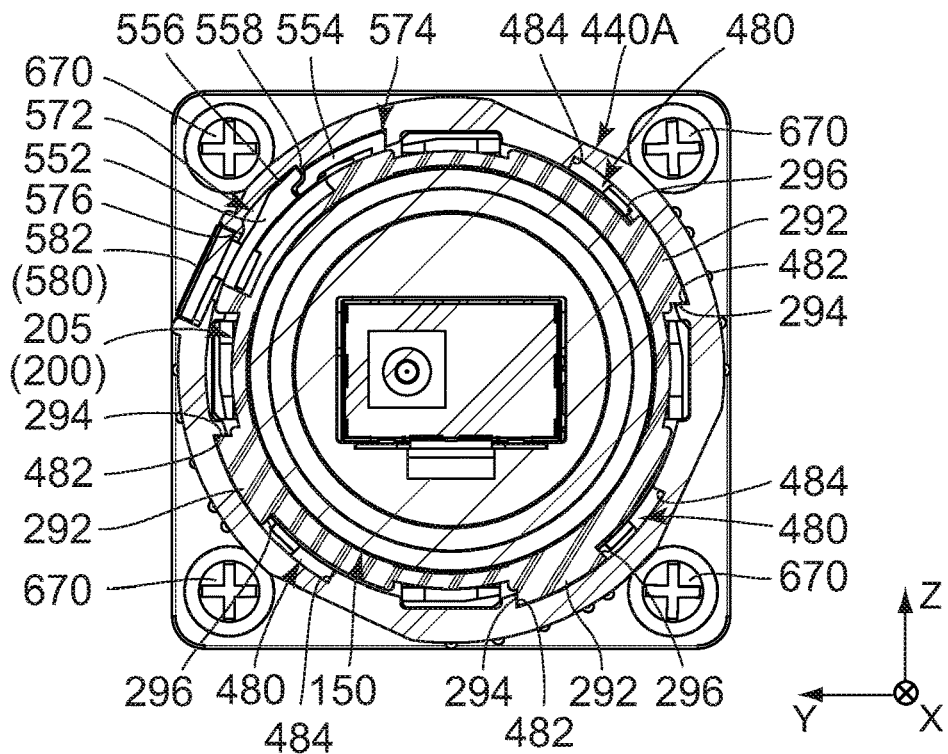
FIG. 38 is a cross-sectional view showing the connector device of FIG. 29. A position of the cross-section corresponds to that of the cross-section in FIG. 19. In the figure, the connector and the mating connector are in a first mated state. Moreover, in the figure, the retaining member is positioned in a second position.

As shown in FIG. 38, when the retaining member 440A is positioned in the second position, the tip end portion of the additional supporting portion 552 is accommodated in the additional-supporting-portion-accommodation portion 572 in part. Moreover, the subsidiary resilient piece 554 is accommodated in the subsidiary-resilient-piece-accommodation portion 574 in part. At this time, the operation member 580 is positioned near a rear end portion of the additional supporting portion 552. In other words, the operation member 580 is apart from the operated portion 556 in the circumferential direction R about the axis AX.

Figure 39:
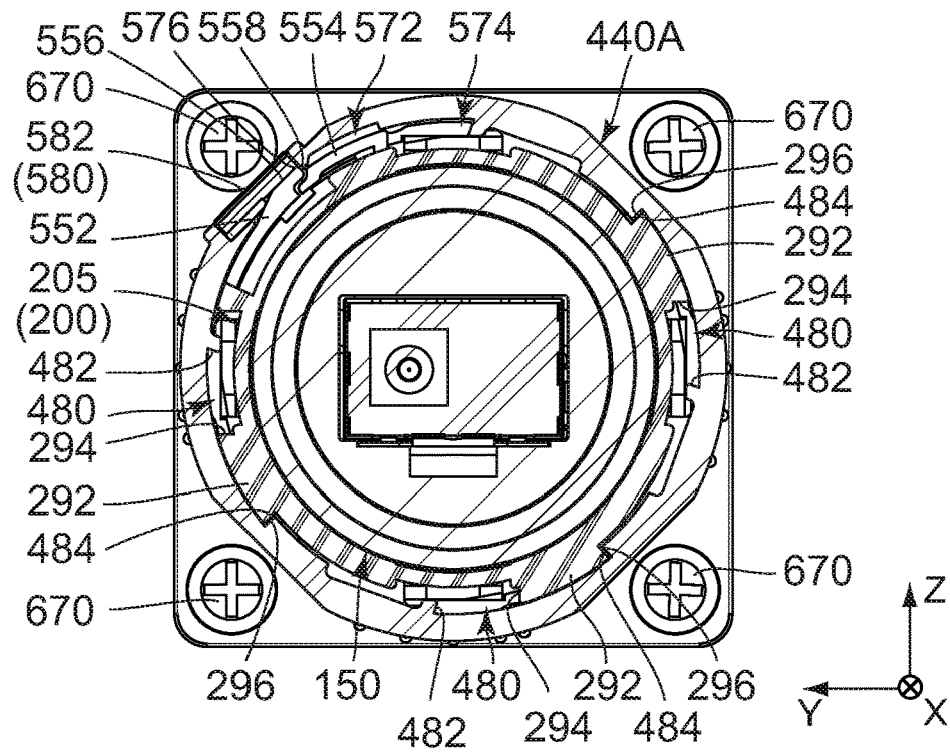
FIG. 39 is a cross-sectional view showing the connector device of FIG. 29. A position of the cross-section corresponds to that of the cross-section in FIG. 26. In the figure, the connector and the mating connector are in a second mated state. Moreover, in the figure, the retaining member is positioned in a first position.
Figure 40:
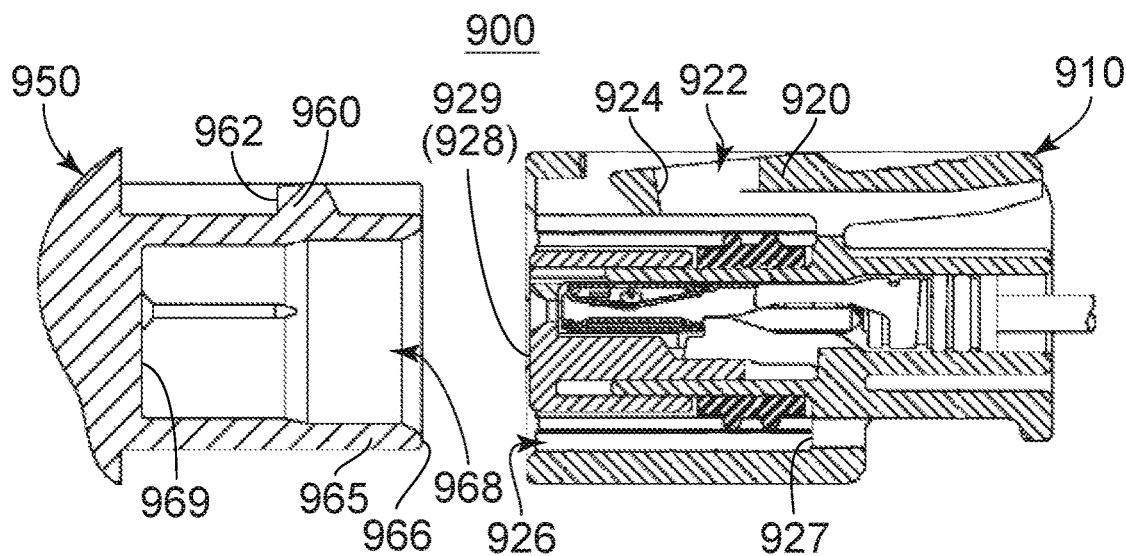
FIG. 40 is a cross-sectional view showing a connector device of Patent Document 1. In the figure, a connector and a mating connector which are included in the connector device are not mated with each other.
Figure 41:
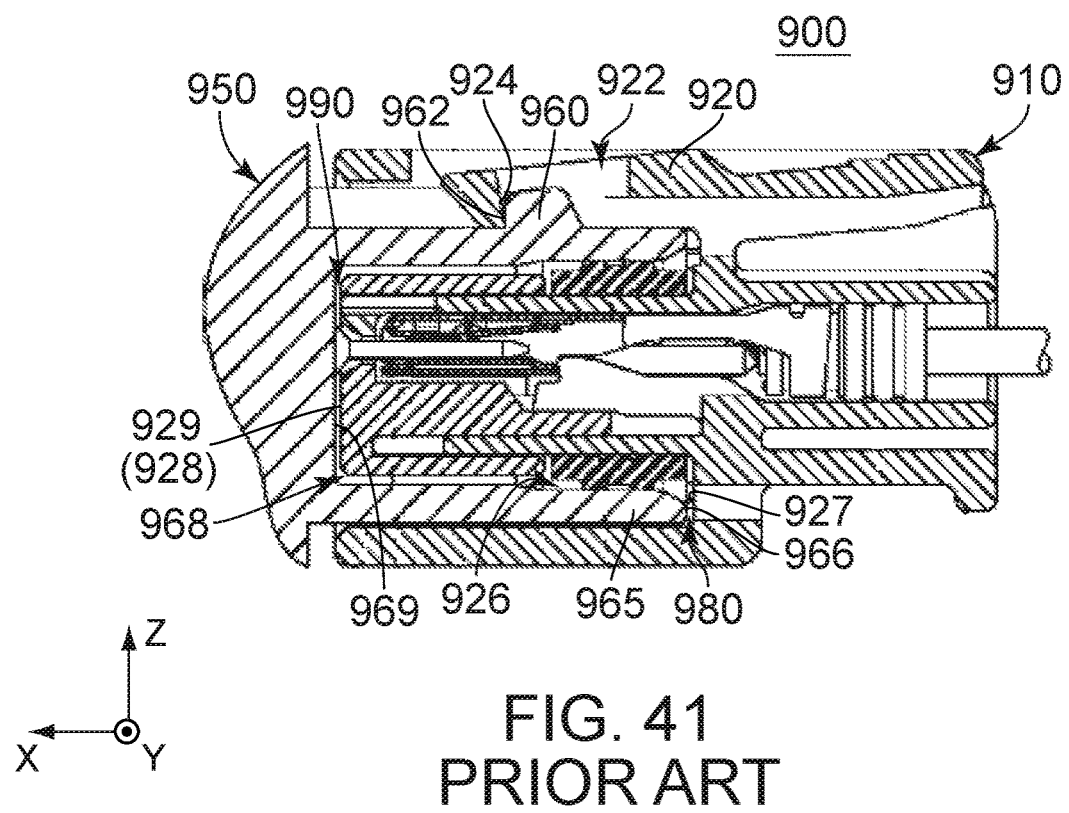
FIG. 41 is another cross-sectional view showing the connector device of FIG. 40. In the figure, the connector and the mating connector are mated with each other.

As shown in FIG. 39, when the retaining member 440A is positioned in the first position, the tip end portion of the additional supporting portion 552 is positioned outside the additional-supporting-portion-accommodation portion 572 and enters in the window portion 570 (see FIGS. 32 and 34) in part. At this time, the extremity surface 558 of the additional supporting portion 552 faces or is in contact with the edge portion 576 of the window portion 570 in the circumferential direction R about the axis AX. In other words, when the retaining member 440A is positioned in the first position, the third regulated portion 576 is in contact with or faces the third regulating portion 558 in the first turning direction. Accordingly, movement of the retaining member 440A from the first position toward the second position in the first turning direction is regulated. Thus, the extremity surface 558 of the additional supporting portion 552 functions as the third regulating portion 558 which regulates the movement of the retaining member 440A in the first turning direction. The edge portion 576 of the window portion 570 functions as the third regulated portion 576. Thus, the additional supporting portion 552 and the window portion 570 function as the maintained-state-holding mechanism 550 which maintains a state that the retaining member 440A is positioned in the first position.

As shown in FIG. 39. when the retaining member 440A is positioned in the first position, the operation portion 582 of the operation member 580 is positioned outward of the operated portion 556 of the additional supporting portion 552 in the orthogonal direction. At this time, the additional supporting portion 552 is in contact with the operation portion 582 of the operation member 580. In detail, the additional supporting portion 552 presses the operation member 580 outward in the orthogonal direction by a reaction force.

As understood from FIG. 39, the operation portion 582 of the operation member 580 is moved inward in the orthogonal direction when receiving an inward force in the orthogonal direction. Accordingly, the operated portion 556 of the additional supporting portion 552 receives an inward force in the orthogonal direction from the operation portion 582. In other words, the operation portion 582 presses the operated portion 556 inward in the orthogonal direction when receiving the inward force in the orthogonal direction. When the operated portion 556 receives the inward force in the orthogonal direction, the additional supporting portion 552 is resiliently deformed. When the extremity surface 558 of the additional supporting portion 552 is positioned inward of the edge portion 576 of the window portion 570 in the orthogonal direction as a result, the retaining member 440A becomes movable in the first turning direction. In this way, regulation made by the third regulating portion 558 and the third regulated portion 576 on the movement of the retaining member 440A in the first turning direction is released.

Although the specific explanation about the present invention is made above referring to the embodiments, the present invention is not limited thereto but susceptible of various modifications.

Although the connector device 10 of the first embodiment has the electrical contact between the terminal 500 of the connector 100 and the mating terminal 700 of the mating connector 600, the present invention is applicable to an optical connector device having no electrical contact. If there is a space when an optical connector and a mating optical connector are mated with each other in the optical connector device, there is possibility that the optical connector is moved with respect to the mating optical connector in the front-rear direction. Accordingly, there is a possibility that dust, such as shavings, is produced and that connection characteristics of the optical connector device are degraded. However, by applying the present invention to the optical connector device, these problems can be avoided.

The connector device 10 of the first embodiment is provided with no coupling nut for maintaining the mated state between the connector 100 and the mating connector 600. However, the present invention is not limited thereto. The connector device 10 may be provided with a coupling nut for maintaining the mated state between the connector 100 and the mating connector 600.

The maintaining mechanism 400 of the connector device 10 of the first embodiment is provided with the additional resilience portions 420. However, the present invention is not limited thereto. The maintaining mechanism 400 may be provided with a rising part rising inward in the orthogonal direction on an inner surface of the retaining member 440 in place of the additional resilience portion 420 and may be formed so that the rising part of the retaining member 440 suppresses outward movement of the locking portions 250 of the locking member 200 in the orthogonal direction. Here, the part provided on the inner surface of the retaining member 440 and rising inward in the orthogonal direction may be formed so that an elastic body, such as a ring-shape rubber, is adhered on the inner surface of the retaining member 440 and functions similarly to the additional resilience portions 420. Moreover, in a case where the connector device 10 is provided with the aforementioned coupling nut, instead of providing the maintaining mechanism 400, a part rising inward in the orthogonal direction may be provided on an inner surface of the coupling nut, and the rising part of the coupling nut may suppress outward movement of the locking portions 250 of the locking member 200 in the orthogonal direction.

In the connector device 10 of the first embodiment, in each of the first mated state and the second mated state, the mating locking portion 660 is positioned inward of the locking portion 250 in the orthogonal direction, and the maintaining mechanism 400 is positioned outward of the supporting portion 220 in the orthogonal direction. However, the present invention is not limited thereto. In other words, in each of the first mated state and the second mated state, the mating locking portion 660 may be positioned outward of the locking portion 250 in the orthogonal direction, and the maintaining mechanism 400 may be positioned inward of the supporting portions 220 in the orthogonal direction.

In the connector device 10 of the first embodiment, the intersecting surfaces 252 and 662 are provided to both of the locking portion 250 and the mating locking portion 660. However, the present invention is not limited thereto. At least one of the locking portion 250 and the mating locking portion 660 may have the intersecting surface 252 or 662 intersecting with both of the front-rear direction and the orthogonal direction. However, in the case where both of the locking portion 250 and the mating locking portion 660 have the intersecting surfaces 252 and 662 like the present embodiment, one of the intersecting surfaces 252 and 662 is in point or line contact with the other even if the intersecting surfaces 252 and 662 have manufacturing variations and/or abrasion. Accordingly, a force is certainly transmitted between the locking portion 250 and the mating locking portion 660. Therefore, it is more preferably.

In the connector device 10 of the first embodiment, each of the locking member 200 and the retaining member 440 is formed to be mirror images with respect to the axis AX. However, the locking member 200 and the retaining member 440 may be formed not to be mirror images. For example, by making different in size between one of the four platform-shaped supporting portions 292 and the remaining of the platform-shaped supporting portions 292, it is possible to attach the retaining member 440 to the locking member 200 in only a predetermined direction. Accordingly, assembling errors are prevented.

The present invention is based on Japanese Patent Application No. 2018-241233 filed on Dec. 25, 2018, and the contents of which forms a part of the present specification by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

REFERENCE SIGNS LIST 10,10A connector device
100,100A connector
150 connector body
160 front-rear-movement regulating portion (rear surface)
170 optical module
174 electric connector
180 holding member
181 insertion portion
183 protrusion
187 optical module accommodation portion
190 protruding portion
192 front surface (receiving portion)
200,200A locking member
205 sidewall
210 slit
212 slit pair
220 supporting portion
240 projecting portion
242 inner surface
250 locking portion
252 intersecting surface
270 front-rear-movement regulated portion
280,280A regulating portion
282 first regulating surface (first regulating portion)
284,284A second regulating surface (second regulating portion)
286 front surface (fourth regulating portion)
288 provisional regulating portion
290 guide portion
292,292A platform-shaped supporting portion
294,296 side surface
300 optical connector
310 protruding portion
312 rear surface(fifth regulating portion)
400 maintaining mechanism
420 additional resilience portion
422 connection portion
423 pressed portion
424 chamfer
440,440A retaining member
442 additional-resilience-portion accommodation portion
444 inclined surface
446 pressing portion
450,450A regulating-portion accommodation portion(accommodation portion)
452 first inner surface(first regulated portion)
454 second inner surface(second regulated portion)
456 front surface (fourth regulated portion)
458 protruding portion(holding mechanism)
460 groove
462 rear surface (fifth regulated portion)
480 platform-shaped-supporting portion accommodation portion
482,484 inner side surface
500 terminal
550 maintained state holding mechanism
552 additional supporting portion
556 operated portion
558 extremity surface(third regulating portion)
560,562 the leg accommodation portions 560 and 562
554 subsidiary resilient piece
570 window portion
572 additional-supporting portion accommodation portion
574 subsidiary-resilient-piece accommodation portion
576 the edge portions(third regulated portion)
580 operation member
582 operation portion
584,586 leg portion
588,590 hook portion
600 mating connector
610 mating connector body
612 mating electric connector
630 mating shell
631 mating shell body
632 abutment portion
640 mating projecting portion
645 bulge portion
647 outer surface
650 depressed portion
652 bottom surface
658 front surface
660 mating locking portion
662 intersecting surface(rear surface, end face)
670 fixing screw
680 connector accommodation portion
682 opening portion
700 mating terminal
750 optical fiber cable
800 case 810 circuit board
AX axis
R circumferential direction
D distance

The invention claimed is:

1. A connector device comprising a connector and a mating connector which is mateable with and removable from the connector along a front-rear direction, wherein:
    in a mated state that the connector and the mating connector are mated with each other, the mating connector is positioned forward of the connector in the front-rear direction;
    the connector comprises a locking member, a receiving portion, an additional resilience portion and a retaining member;
    the locking member has at least one supporting portion and at least one locking portion;
    the supporting portion has resilience and supports the locking portion;
    the locking portion is movable at least in an orthogonal direction orthogonal to the front-rear direction owing to a resilient deformation of the supporting portion;
    the mating connector comprises at least one mating locking portion and an abutment portion;
    in the mating connector, relative positions of the mating locking portion and the abutment portion in the front-rear direction are fixed;
    at least one of the locking portion and the mating locking portion has an intersecting surface intersecting with both of the front-rear direction and the orthogonal direction;
    in the mated state, the mating locking portion is positioned inward of the locking portion in the orthogonal direction;
    in the mated state, the locking portion is pressed against the mating locking portion in the intersecting surface owing to the resilience of the supporting portion and applies a rearward force in the front-rear direction to the mating locking portion;
    in the mated state, the abutment portion is positioned forward of the receiving portion in the front-rear direction and brought into abutment with the receiving portion by the rearward force so that rearward movement of the abutment portion is regulated by the receiving portion so as not to be beyond the receiving portion;
    the retaining member is located outward of the locking member in the orthogonal direction and attached to the locking member to be relatively movable with respect to the locking member between a first position and a second position in a movable direction orthogonal to both of the front-rear direction and the orthogonal direction;
    the additional resilience portion is located inward of the retaining member in the orthogonal direction;
    when the retaining member is positioned in the first position in the mated state, the additional resilience portion lies between the supporting portion and the retaining member and presses the supporting portion by applying an inward force in the orthogonal direction to the supporting portion so as to form a maintained state maintaining pressing of the locking portion against the mating locking portion; and
    when the retaining member is positioned in the second position in the mated state, the additional resilience portion does not press the supporting portion so that the maintained state is cancelled.

2. The connector device as recited in claim 1, wherein:
    the orthogonal direction is any one of radial directions of an imaginary circle having a center on an axis extending in the front-rear direction;
    the movable direction is a circumferential direction of the imaginary circle; and
    the retaining member is attached to the locking member so as to be turnable in the circumferential direction.

3. The connector device as recited in claim 2, wherein:
    the moving direction of the retaining member from the first position to the second position is a first turning direction;
    the moving direction of the retaining member from the second position to the first position is a second turning direction;
    the retaining member is provided with a first regulated portion and a second regulated portion;
    the locking member is provided with a first regulating portion and a second regulating portion;
    when the retaining member is positioned in the second position, the first regulating portion is in contact with or faces the first regulated portion in the second turning direction and regulates movement of the retaining member so that the retaining member is not moved beyond the second position in the first turning direction; and
    when the retaining member is positioned in the first position, the second regulating portion is in contact with or faces the second regulated portion in the first turning direction and regulates movement of the retaining member so that the retaining member is not moved beyond the first position in the second turning direction.

4. The connector device as recited in claim 3, wherein the connector device further comprises a holding mechanism to hold the retaining member in the first position.

5. The connector device as recited in claim 4, wherein:
    the locking member is provided with a regulating portion protruding outward in the radial direction;
    the regulating portion has a first regulating surface directed in the second turning direction, a second regulating surface directed in the first turning direction and a provisional regulating portion;
    the first regulating surface functions as the first regulating portion;
    the second regulating surface functions as the second regulating portion;
    the retaining member is provided with an accommodation portion to accommodate the regulating portion at least in part;
    the accommodation portion has a first inner surface directed in the first turning direction and a second inner surface directed to the second turning direction;
    the first inner surface functions as the first regulated portion;
    the second inner surface functions as the second regulated portion;
    the holding mechanism is a protruding portion protruding inward in the radial direction in the accommodation portion; and
    when the retaining member is positioned in the first position, the provisional regulating portion is in contact with or faces the protruding portion in the first turning direction and provisionally regulates movement of the retaining member in the first turning direction.

6. The connector device as recited in claim 5, wherein:
the regulating portion is provided with a guide portion; and
the guide portion guides the protruding portion to be moved on the regulating portion when the retaining member is moved from the second position to the first position.

7. The connector device as recited in claim 5, wherein:
the locking member is further formed with a platform-shaped supporting portion; and
the platform-shaped supporting portion is juxtaposed with the regulating portion in the front-rear direction.

8. The connector device as recited in claim 5, wherein:
the locking member is further provided with an additional supporting portion and a third regulating portion;
the additional supporting portion has resilience and supports the third regulating portion;
the third regulating portion is movable at least in the radial direction owing to resilient deformation of the additional supporting portion;
the additional supporting portion has an operated portion;
the retaining member is further provided with a third regulated portion;
the connector further comprises an operation member;
the operation member is attached to the retaining member to be movable in the radial direction;
when the retaining member is positioned in the first position, the third regulating portion is in contact with or faces the third regulated portion and regulates movement of the retaining member in the first turning direction:
when the retaining member is positioned in the second position, the operation member is apart from the operated portion in the circumferential direction;
when the retaining member is positioned in the first position, the operation member is positioned outward of the operated portion in the radial direction; and
when the retaining member is positioned in the first position, upon receiving an inward force in the radial direction, the operation member presses the operated portion and resiliently deforms the additional supporting portion to move the third regulating portion inward in the radial direction so that regulation of movement of the retaining member in the first turning direction is released.

9. The connector device as recited in claim 8, wherein the additional supporting portion is a resilient piece with a cantilever-shape extending in the second turning direction.

10. The connector device as recited in claim 9, wherein:
the operation member has two leg portions located apart from each other in the front-rear direction;
the operation member is arranged to extend over the additional supporting portion in the front-rear direction;
the locking member is provided with the leg accommodation portions to accommodate the leg portions, respectively, and to allow the leg portions to be moved when the operation member is moved between the first position and the second position;
the leg accommodation portions are adjacent to the additional supporting portion in the front-rear direction and communicate with a space located inward of the additional supporting portion in the radial direction;
the locking member further has a subsidiary resilient piece with a cantilever-shape extending in the first turning direction;
the subsidiary resilient piece is located inward of the additional supporting portion in the radial direction; and
when the third regulating portion is moved inward in the radial direction, the additional supporting portion is brought into abutment with the subsidiary resilient piece.

11. The connector device as recited in claim 9, wherein the third regulating portion is an extremity surface of the additional supporting portion.

12. The connector device as recited in claim 9, wherein the operation member is arranged so that at least a part of the operation member is located outward of the additional supporting portion in the radial direction.

13. The connector device as recited in claim 5, wherein:
the connector further comprises a connector body;
the locking member covers the connector body at least in part;
the additional resilience portion and the regulating portion are arranged apart from each other in each of the circumferential direction and the front-rear direction.

14. The connector device as recited in claim 13, wherein the aforementioned additional resilience portion and the aforementioned first regulated portion respectively comprise a plurality of additional resilience portions, which are arranged at regular intervals in the circumferential direction, and a plurality of first regulated portions, which are arranged at regular intervals in the circumferential direction.

15. The connector device as recited in claim 1, wherein:
the retaining member is provided with a fourth regulated portion and a fifth regulated portion;
the locking member is provided with a fourth regulating portion and a fifth regulating portion;
the fourth regulating portion is in contact with or faces the fourth regulated portion in the front-rear direction and regulates rearward movement of the retaining member in the front-rear direction; and
the fifth regulating portion is in contact with or faces the fifth regulated portion in the front-rear direction and regulates forward movement of the retaining member in the front-rear direction.

16. The connector device as recited in claim 1, wherein:
the additional resilience portion is formed to the locking member; and
the additional resilience portion is a spring extending like a cantilever from the supporting portion.

* * * * *